(12) United States Patent
Kato et al.

(10) Patent No.: US 8,072,304 B2
(45) Date of Patent: Dec. 6, 2011

(54) NONCONTACT POWER-TRANSMISSION COIL, PORTABLE TERMINAL AND TERMINAL CHARGING DEVICE, PLANAR COIL MAGNETIC LAYER FORMATION DEVICE, AND MAGNETIC LAYER FORMATION METHOD

(75) Inventors: Hiroshi Kato, Kanagawa (JP); Kuniharu Suzuki, Tokyo (JP); Katsuya Suzuki, Gunma (JP); Manabu Yamazaki, Kanagawa (JP); Yoichiro Kondo, Nagano (JP); Kota Onishi, Aichi (JP); Kentaro Yoda, Nagano (JP); Mikimoto Jin, Nagano (JP); Takahiro Kamijo, Nagano (JP); Haruhiko Sogabe, Nagano (JP)

(73) Assignees: Sony Ericsson Mobile Communications Japan, Inc., Tokyo (JP); Seiko Epson Corporation, Tokyo (JP)

( * ) Notice: Subject to any disclaimer, the term of this patent is extended or adjusted under 35 U.S.C. 154(b) by 379 days.

(21) Appl. No.: 12/007,077

(22) Filed: Jan. 7, 2008

(65) Prior Publication Data
US 2008/0164844 A1    Jul. 10, 2008

(30) Foreign Application Priority Data

Jan. 9, 2007  (JP) ................................. 2007-001642

(51) Int. Cl.
| | | |
|---|---|---|
| H01F 5/00 | (2006.01) | |
| H01F 27/29 | (2006.01) | |
| H01F 27/28 | (2006.01) | |
| H01F 27/24 | (2006.01) | |
| H01F 27/42 | (2006.01) | |
| H02J 7/00 | (2006.01) | |
| B05B 7/00 | (2006.01) | |
| B05D 5/12 | (2006.01) | |
| H01F 7/06 | (2006.01) | |
| G11C 5/12 | (2006.01) | |

(52) U.S. Cl. ........ 336/200; 336/192; 336/222; 336/232; 336/233; 320/114; 307/104; 118/300; 427/130; 29/606; 29/737

(58) Field of Classification Search .................. None
See application file for complete search history.

(56) References Cited

U.S. PATENT DOCUMENTS

| | | | | |
|---|---|---|---|---|
| 5,430,424 | A * | 7/1995 | Sato et al. ............... | 336/200 |
| 5,659,461 | A * | 8/1997 | Inou et al. .............. | 363/21.16 |
| 6,008,622 | A * | 12/1999 | Nakawatase ............ | 320/108 |
| 7,042,325 | B2 * | 5/2006 | Giandalia et al. ....... | 336/200 |
| 7,474,189 | B1 * | 1/2009 | Dening et al. .......... | 336/200 |
| 2002/0097124 | A1 * | 7/2002 | Inoue et al. ............. | 336/83 |

(Continued)

FOREIGN PATENT DOCUMENTS

JP        03-90371        9/1991

(Continued)

Primary Examiner — Anh Mai
Assistant Examiner — Mangtin Lian
(74) Attorney, Agent, or Firm — Rader, Fishman & Grauer PLLC

(57) ABSTRACT

A noncontact power-transmission coil is provided. The noncontact power-transmission coil includes a planar coil and a magnetic layer. The planar coil is formed by winding a linear conductor in a spiral shape substantially in a single plane. The magnetic layer is formed by applying a liquid-form magnetic solution in which magnetic particles are mixed with a binder solvent, so as to cover one planar portion of the planar coil and a side-face portion of the planar coil.

15 Claims, 17 Drawing Sheets

U.S. PATENT DOCUMENTS

| | | | |
|---|---|---|---|
| 2003/0020583 A1* | 1/2003 | Hui et al. | 336/200 |
| 2008/0164840 A1* | 7/2008 | Kato et al. | 320/108 |

FOREIGN PATENT DOCUMENTS

| | | |
|---|---|---|
| JP | 07-263935 A | 10/1995 |
| JP | 2000-200725 A | 7/2000 |
| JP | 2004-047700 | 2/2004 |
| JP | 2004-534495 T | 11/2004 |
| JP | 2006-42519 | 2/2006 |
| JP | 2006-339329 A | 12/2006 |

\* cited by examiner

NONCONTACT POWER-TRANSMISSION COIL, PORTABLE TERMINAL AND TERMINAL CHARGING DEVICE, PLANAR COIL MAGNETIC LAYER FORMATION DEVICE, AND MAGNETIC LAYER FORMATION METHOD

CROSS-REFERENCES TO RELATED APPLICATIONS

The present invention contains subject matter related to Japanese Patent Application JP 2007-001642, filed in the Japanese Patent Office on Jan. 9, 2007, the entire contents of which are incorporated herein by reference.

BACKGROUND OF THE INVENTION

1. Field of the Invention

This invention relates to a noncontact power-transmission coil for use in power transmission in a noncontact manner using electromagnetic induction, when charging a rechargeable battery incorporated in a small-size, thin portable terminal such as a mobile phone unit. The invention further relates to a portable terminal and terminal charging device incorporating such a noncontact power-transmission coil, and to a magnetic layer formation device and magnetic layer formation method for forming a magnetic layer in a planar coil of such a noncontact power-transmission coil.

2. Description of the Related Art

In the past, systems have been known in which charging power to charge a rechargeable battery incorporated within a portable terminal, for example, has been transmitted by electromagnetic induction using a noncontact power-transmission coil.

In addition, Japanese Unexamined Patent Application Publication No. 2006-42519 (FIG. 2 and FIG. 3) discloses a planar coil as a noncontact power-transmission coil mounted on a portable terminal desired to be thin, such as a mobile phone unit. In this case, the planar coil is constructed such that an electric wire is formed of a single or twisted wire. The surface of the wire is provided with an insulating layer. In addition, the wire is spirally wound in a substantially same plane. Furthermore, this Patent Document also discloses that the formation of a magnetic sheet. That is, a planer coil on the power-transmitting side and a planar coil on the power-receiving side are arranged facing to each other. Then, the counter surface of each coil, which is opposite to the surface facing to the other coil, is entirely covered with a magnetic sheet to prevent undesired radiation with the magnetic field generated from both coils.

SUMMARY OF THE INVENTION

FIG. 1 and FIG. 2 show in summary the construction of a noncontact power-transmission coil 200 employing a spiral-shape planar coil of the related art.

As shown in FIG. 1, in a spiral-shape planar coil, an electric wire 201, which employs either single wire or twisted wire, is wound in a spiral shape within a shingle plane. An electric wire end portion (for example, the electric wire and portion on the side at the end of the winding) 205 on the outer periphery 203 of the planar coil is drawn to the outside. On the other hand, the electric wire end portion (the electric wire end portion at the beginning of the winding, for example) 204 on the inner periphery 202 passes over (or under) an electric wire portion wound into the spiral shape and is drawn to the outside. As shown in FIG. 2, a magnetic sheet 210 is affixed on one planar portion of the planar coil of the noncontact power-transmission coil 200 through an adhesive sheet 211 or similar. The other planar portion is affixed, as necessary, to the inner wall or similar of a terminal housing 213 using an adhesive sheet 212 or similar. Although not shown in the figure, a metal sheet, of aluminum or similar, is also affixed to the outside of the magnetic sheet 210.

However, in recent years there has been a desire for still thinner mobile phone units and similar, and to this end there has been a desire to reduce the thicknesses not only of the various electronic components themselves arranged in the terminal housing, but to reduce the thickness of the noncontact power-transmission coils having the above-described spiral-shape planar coils.

In the case of noncontact power-transmission coils 200 such as shown in the above FIG. 1 and FIG. 2, as the adhesive sheet 211 used to affix a magnetic sheet 210 to the planar coil for magnetic path formation, a sheet of approximately a certain thickness and having elasticity is used. That is, because depressions and protrusions are formed in the planar portion of the planar coil by the windings of electric wire 201, if a thin adhesive sheet, for example, is used, the adhesive properties of the planar coil and the magnetic sheet may not be sufficient, and the magnetic sheet may separate from the planar coil. Hence in order to absorb depressions and protrusions in the planar coil surface and enhance the adhesion between the planar coil and the magnetic sheet, the adhesive sheet 211 is used which has approximately a certain thickness, and which moreover has elasticity.

However, use of the adhesive sheet 211 which is thick is not preferable from the standpoint of reducing the thickness of the noncontact power-transmission coil, and may be the cause of not sufficiently reducing the thickness of mobile phone units.

Further, in the above-described noncontact power-transmission coil, the magnetic sheet 210 is provided in order to efficiently form a magnetic path and improve the power-transmission characteristics. However, even a noncontact power-transmission coil having such a magnetic sheet may have less efficiency compared with power transmission performed by direct connection using an ordinary connector or similar, and so further enhancement of power-transmission efficiency by noncontact power-transmission coils may be required.

It is desirable to provide a noncontact power-transmission coil with a thinner shape and enabling higher-efficiency power transmission, and to provide a portable terminal and terminal charging device incorporating such a noncontact power-transmission coil, and a planar coil magnetic layer formation device and magnetic layer formation method.

According to an embodiment of the present invention, there is provided a noncontact power-transmission coil including a planar coil, formed by winding a linear conductor in a spiral shape substantially within the same plane, and a magnetic layer, formed by applying a liquid-form magnetic solution, in which magnetic particles are mixed into a binder solvent, so as to cover one planar portion of the planar coil and a side-face portion of the planar coil.

According to another embodiment of the present invention, there is provided a portable terminal including a rechargeable battery; a noncontact power-transmission coil, having a planar coil, formed by winding a linear conductor in a spiral shape substantially within the same plane, and a magnetic layer formed by applying a liquid-form magnetic solution, in which magnetic particles are mixed into a binder solvent, so as to cover one planar portion of the planar coil and a side-face portion of the planar coil. Further, the portable terminal includes a charging control circuit, which executes control so as to charge the rechargeable battery with power received via the noncontact power-transmission coil.

According to further embodiment of the present invention, there is provided a terminal charging device including a terminal mounting base, in which a predetermined portable terminal provided with a rechargeable battery is mounted; a noncontact power-transmission coil; and a power supply control unit. The noncontact power-transmission coil has a planar coil, formed by winding a linear conductor in a spiral shape substantially within the same plane, and a magnetic layer formed by applying a liquid-form magnetic solution, in which magnetic particles are mixed into a binder solvent, so as to cover one planar portion of the planar coil and a side-face portion of the planar coil. The noncontact power-transmission coil uses electromagnetic induction with a coil installed in the predetermined portable terminal to charge the rechargeable battery of the portable terminal in a noncontact manner. The power supply control unit controls the supply of power to the noncontact power-transmission coil.

According to further another embodiment of the present invention, there is provided a planar coil magnetic layer formation device including a planar coil-fitting portion and a magnetic solution application portion. The planar coil-fitting portion has a bottom-face portion on which is placed the other planar-portion side of the planar coil formed by winding a linear conductor in a spiral shape substantially within the same plane, and an inner-wall portion which is larger than at least the outer-perimeter diameter of the planar coil, and in which is formed a depressed shape which is at least deeper than the thickness of the planar coil. The magnetic solution application portion forms a magnetic layer covering one planar portion of the planar coil and a side-face portion of the planar coil in a state in which a planar coil is fitted into the planar coil-fitting portion, by applying from an aperture portion of the planar coil-fitting portion a magnetic solution in liquid form in which magnetic particles are mixed into a binder solvent.

According to still another embodiment of the present invention, there is provided a planar coil magnetic layer formation method including the steps of:

fitting a planar coil, formed by winding a linear conductor in a spiral shape substantially within the same plane, into a planar coil-fitting portion, having a bottom-face portion on which one planar portion side of the planar coil is placed and an inner-wall portion which is larger than at least the outer-perimeter diameter of the planar coil, and in which is formed a depressed shape which is at least deeper than the thickness of the planar coil; and forming a magnetic layer which covers one planar portion of the planar coil and a side-face portion of the planar coil, by applying, in a state in which the planar coil is fitted into the planar coil-fitting portion, a liquid-form magnetic solution in which magnetic particles are mixed into a binder solvent, from an aperture in the planar coil-fitting portion, using a magnetic solution application portion.

That is, according to the embodiments of this invention, by applying a magnetic layer so as to cover one planar portion and a side-face portion of the planar coil, a magnetic path can be formed efficiently, and moreover linked magnetic flux can be increased.

According to the embodiments of the invention, by applying a magnetic layer so as to cover one planar portion and the side-face portion of the planar coil, a noncontact power-transmission coil can be made even thinner and power-transmission efficiency can be improved, and moreover a portable terminal and terminal charging device can also be made thinner.

BRIEF DESCRIPTION OF THE DRAWINGS

FIG. 8 is a schematic cross-sectional view of the portion in proximity to two noncontact power-transmission coils, positioned in proximity, in a mobile phone unit and in a cradle, with a magnetic sheet, larger than the planar portion of the planar coils, affixed so as to cover the planar portions and wall-face portions of the housings and similar.

DESCRIPTION OF THE PREFERRED EMBODIMENTS

Figure 1:
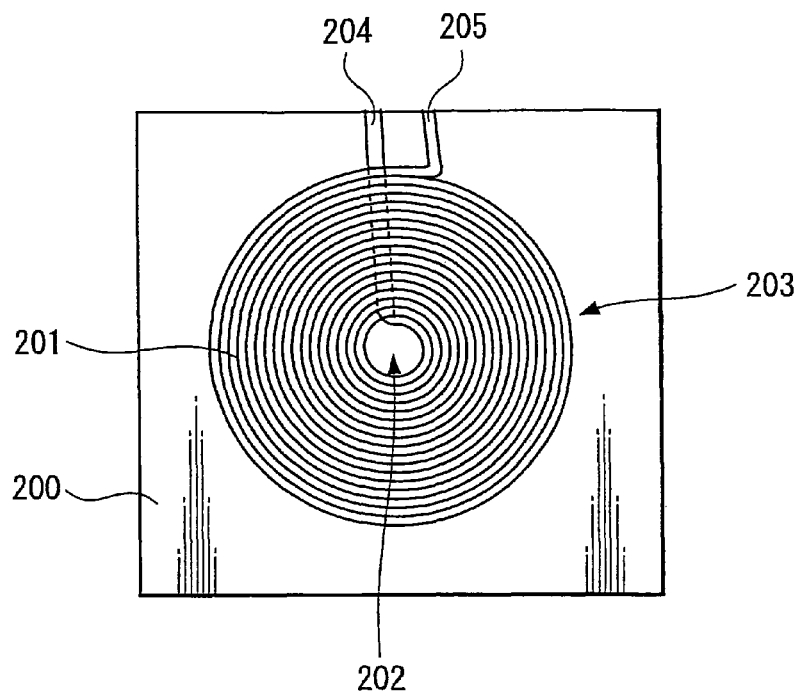
FIG. 1 is a schematic diagram seen from the front of a planar coil of the related art, in which an electric wire end on the inner-periphery side of an electric wire wound into a spiral shape passes over or under an electric wire portion wound into the spiral shape and is drawn to the outside.

Below, embodiments of the invention are explained, referring to the drawings.

In the embodiments, a mobile phone unit is described as an example of a portable terminal including a noncontact power-transmission coil having a spiral-shape planar coil according to an embodiment of the invention, and a cradle capable of charging at least the above mobile phone unit is described as an example of a terminal charging device according to an embodiment of the invention; of course these explanations are examples, and the invention is not limited to these examples.

[Basic Configuration and Operation During Charging of Cradle and Mobile Phone Unit]

Figure 3:
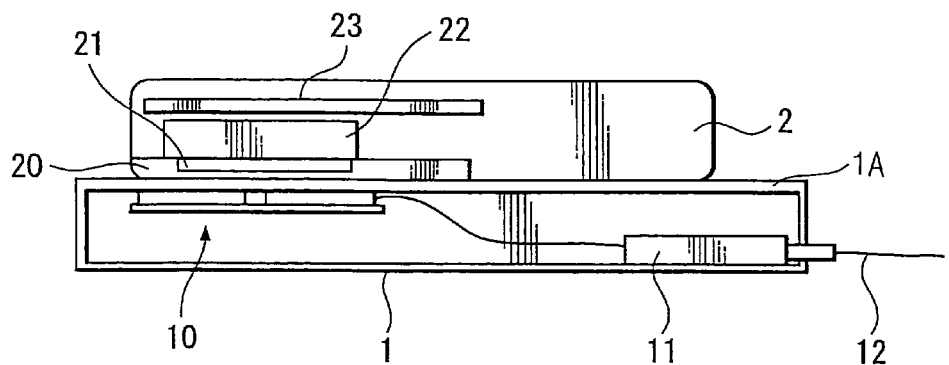
FIG. 3 is a schematic diagram showing an internal construction of principal portions of a mobile phone unit and a cradle according to an embodiment of the invention.

FIG. 3 is a schematic diagram showing the internal construction of principal portions of a mobile phone unit 2 and a cradle 1 according to an embodiment of the invention.

The mobile phone unit 2 of this embodiment includes, within a housing thereof, at least a battery 22 having a rechargeable battery which generates the operating power for the unit; a secondary transmission coil 21 which is the receiving-side noncontact power-transmission coil during charging of the battery 22; and a circuit board 23 on which are mounted various electronic circuits including a charging control circuit to supply the power received via the secondary transmission coil 21 to the battery 22 to charge the battery 22. In this embodiment, other constituent elements provided in general mobile phone units are omitted from the drawings and from the explanations.

The battery 22 can be attached and detached, and a battery cover 20, which can be opened and closed (or attached and detached) when attaching and detaching the battery 22, is provided on the mobile phone unit 2.

As explained below, the secondary transmission coil 21 employs a planar coil in which a linear conductor having electric conductivity is formed in a spiral shape. One of the planar portions of the secondary transmission coil 21 is affixed to the inner-wall face of the battery cover 20, or to the outer surface on the battery cover side of the battery 22. In this embodiment, an example is explained in which the secondary transmission coil 21 is affixed to the inner-wall face of the battery cover 20. Details of the configuration of the secondary transmission coil 21 are explained below.

On the other hand, the cradle 1 of this embodiment includes, within the cradle housing, at least a primary transmission coil 10, which is the transmitting-side noncontact transmission coil during charging of the battery 22 of the mobile phone unit 2; a control board portion 11 which supplies power to the primary transmission coil 10 and controls the supply thereof; and an electric power cord 12 connected to, for example, a commercial power supply. In this embodiment, other constituent elements provided in general cradles are omitted from the drawings and from the explanations.

The primary transmission coil 10 of the cradle 1, substantially similarly to the secondary transmission coil 21 of the mobile phone unit 2, is a planar coil formed by winding a linear conductor having electric conductivity in a spiral shape. One planar portion of this primary transmission coil 10 is affixed to a housing inner-wall face of a terminal mounting base 1A provided in the cradle 1.

The mobile phone unit 2 is placed on the terminal mounting base of the cradle 1. Through the proximate positioning of the secondary transmission coil 21 of the mobile phone unit 2 and the primary transmission coil 10 of the cradle 1, the state of the magnetic field within the primary transmission coil 10 changes. Then, the control board portion 11 monitors changes in the state of the magnetic field in the primary transmission coil 10 when the secondary transmission coil 21 is positioned in proximity, by intermittent driving or similar.

The charging control circuit of the mobile phone unit 2 of this embodiment is able to detect voltage changes through changes in magnetic field states when the terminal is placed in the terminal mounting base of the cradle 1 and the secondary transmission coil 21 is placed in proximity with the primary transmission coil 10 of the cradle 1, as a result of the occurrence of changes in the magnetic field within the secondary transmission coil 21. Accordingly, the charging control circuit of the mobile phone unit 2 determines that the unit has been placed in the terminal mounting base of the cradle 1, as follows. That is, the charging control circuit of the mobile phone unit 2 detects that the unit has been placed, when the voltage value due to voltage fluctuations caused by changes in the magnetic field state in the secondary transmission coil 21 with the primary transmission coil 10 being placed in proximity is equal to a predetermined voltage value determined in advance.

Further, in this embodiment, the cradle 1 and mobile phone unit 2 can transmit information via the primary transmission coil 10 and the secondary transmission coil 21. For example, when the mobile phone unit 2 is placed in the terminal mounting base of the cradle 1, and the primary coil 10 and secondary coil 21 are detected as being positioned in mutual proximity based on changes in the magnetic field state as described above, the cradle 1 and the mobile phone unit 2, exchange identification information for use in mutual recognition. Such information may be exchanged via the primary transmission coil 10 and secondary transmission coil 21.

Further, in this embodiment, the placement in proximity of the primary coil 10 and secondary coil 21 is detected by both the cradle 1 and by the mobile phone unit 2, and when moreover the cradle 1 and the mobile phone unit 2 have authenticated each other, power is transmitted from the cradle 1. Accordingly, the battery 22 of the mobile phone unit 2 is charged with the transmitted power.

When charging of the battery 22 of the mobile phone unit 2 is started as described above, the control board portion 11 of the cradle 1 converts the commercial AC voltage supplied via the power supply cord 12 into a predetermined DC voltage, and uses the DC voltage to generate an AC voltage of predetermined frequency. The generated AC voltage is supplied to the primary transmission coil 10. On the other hand, on the side of the mobile phone unit 2, when an AC voltage is induced in the secondary transmission coil 21 by the AC voltage from the primary transmission coil 10 of the cradle 1, the induced AC voltage is rectified and converted into a DC voltage, and the DV voltage is used to charge the battery 22.

Further, in this embodiment, the voltage value based on the change in state of the magnetic field of the primary transmission coil 10 may not be a predetermined voltage value determined in advance. Further, the voltage value based on the change in state of the magnetic field of the primary transmission coil 10 may reach the predetermined voltage value determined in advance, but authentication of the other device based on the identification information may not be possible. In such cases, the control board portion 11 of the cradle 1 determines that the state change of the magnetic field of the primary transmission coil 10 has occurred due to the presence on the terminal mounting base of a metal object, such as a coin, or another conductive object, and executes control so that power is not supplied to the primary transmission coil 10.

Further, in this embodiment, when the battery 22 of the mobile phone unit 2 is being charged by the power transmitted from the cradle 1, charging information is transmitted between the cradle 1 and the mobile phone unit 2 via the primary transmission coil 10 and the secondary transmission coil 21. That is, the charging control circuit of the mobile phone unit 2 transmits charging information for the battery 22 to the cradle 1 during charging of the battery 22 by power transmission from the cradle 1. The control board portion 11 of the cradle 1 uses the charging information transmitted from the mobile phone unit 2 to monitor the charging state of the battery 22 of the terminal 2. When the fact that charging of the battery 22 is not completed is ascertained from the charging information, the control board portion 11 continues power transmission via the primary transmission coil 10. However, when the fact that charging of the battery 22 is completed is ascertained from the charging information, the control board portion 11 halts power transmission. Otherwise, the control board portion 11 executes control to halt power transmission when, for example, information indicating some anomaly is supplied from the mobile phone unit 2.

[Explanation of Flux Linkage by the Planar Coil and Magnetic Sheet of a Noncontact Power-Transmission Coil]

Prior to explaining the noncontact power-transmission coil according to the embodiment of the invention, first, the change in linked magnetic flux resulting from the manner of affixing a magnetic sheet to a noncontact power-transmission coil is explained. The magnetic sheet is affixed onto a planar portion of a planar coil in which electric wire which is either single wire or twisted wire is wound in a spiral shape substantially within the same plane.

FIG. 4 through FIG. 9 are schematic cross-sectional views showing the state of placement in proximity, with the respective housing walls intervening, of a noncontact power-transmission coil in a mobile phone unit and of a noncontact power-transmission coil in the cradle. The number of coil windings and the dimensions, positioning, and other details of each of the portions are different from those of an actual case. Components are modified as necessary to facilitate explanation of an embodiment of the invention. Further, in FIG. 4 through FIG. 9 the adhesive sheets are omitted from the figures.

Figure 4:
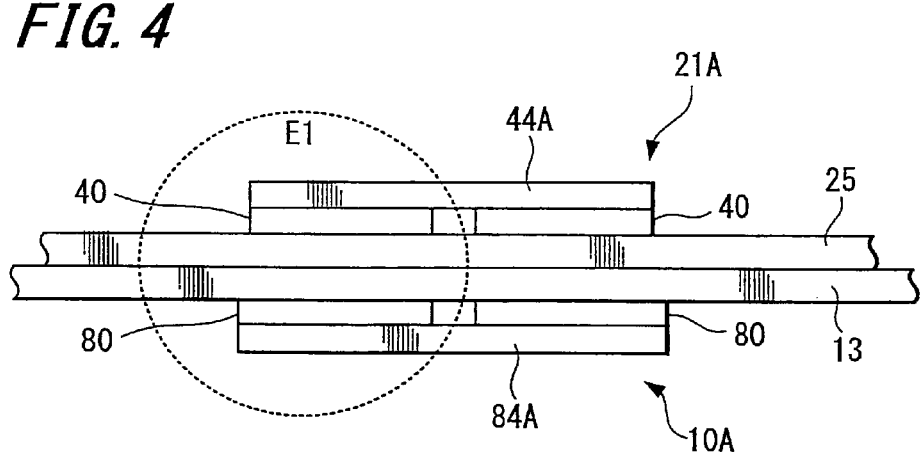
FIG. 4 is a schematic cross-sectional view of a portion in proximity to two noncontact power-transmission coils, positioned in proximity, in a mobile phone unit and in a cradle, with a magnetic sheet affixed only onto planar portions of planar coils.
Figure 6:
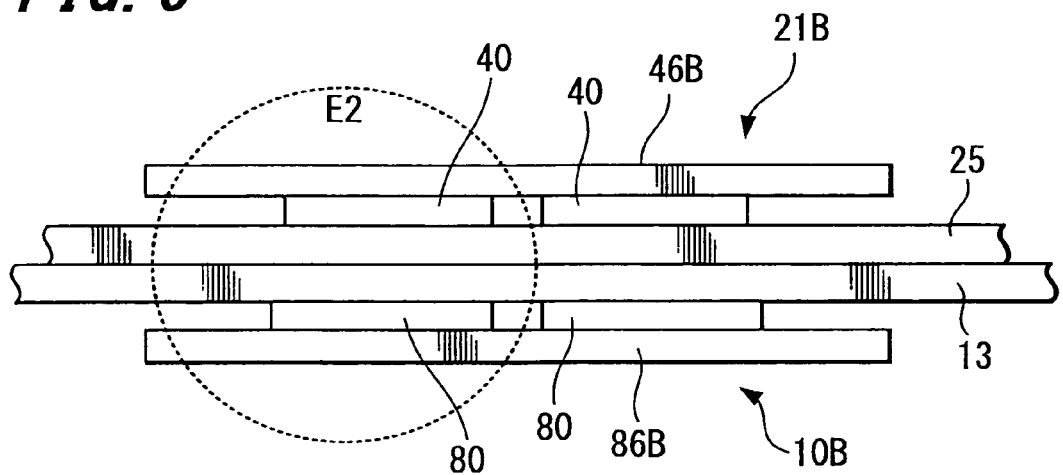
FIG. 6 is a schematic cross-sectional view of the portion in proximity to two noncontact power-transmission coils, positioned in proximity, in a mobile phone unit and in a cradle, with a magnetic sheet, larger than the planar portion of the planar coils, affixed only onto the planar portions of the planar coils.
Figure 8:
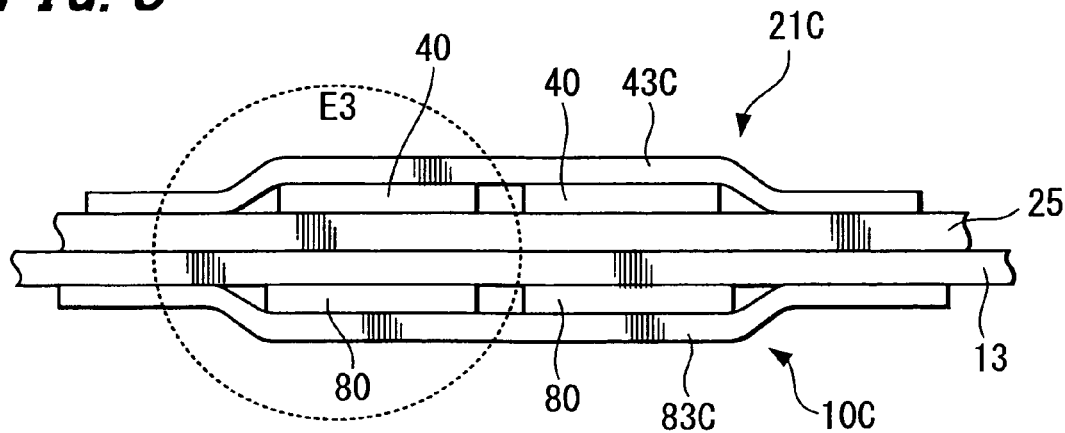

FIG. 4 is a schematic cross-sectional view of the portion in proximity to a noncontact power-transmission coil 21A of a mobile phone unit, with a magnetic sheet 44A affixed onto only a planar portion of the planar coil, formed by winding electric wire 40 which may, for example, be single wire or twisted wire in a spiral shape, with the planar coil affixed onto the wall 25 of the battery cover. In addition, the figure shows the portion in proximity to the coil (the terminal mounting base proximity) of a noncontact power-transmission coil 10A affixed to a housing wall 13 of a cradle, with magnetic sheet 84A formed only on a planar portion of the planar coil, of wound electric wire 80. Similarly, FIG. 6 is a schematic cross-sectional view of the portion in proximity to the noncontact power-transmission coil 21B of the mobile phone unit, with a magnetic sheet 46B larger than the planar portion of the planar coil affixed onto only the planar portion of the planar coil. In addition, the figure shows the portion in proximity to the noncontact power-transmission coil 10B in the cradle, with a magnetic sheet 86B similarly larger than the planar coil affixed only onto the planar portion of the planar coil. FIG. 8 is a schematic cross-sectional view showing the portion in proximity to the noncontact power-transmission coil 21C of the mobile phone unit, with a magnetic sheet 43C larger than the planar portion of the planar coil affixed so as to cover the planar portion and the wall 25. In addition, the figure shows the portion in proximity to the noncontact power-transmission coil 10C in the cradle, with a magnetic sheet 83C larger than the planar portion of the planar coil affixed so as to cover the planar portion and the housing wall 13.

Figure 5:
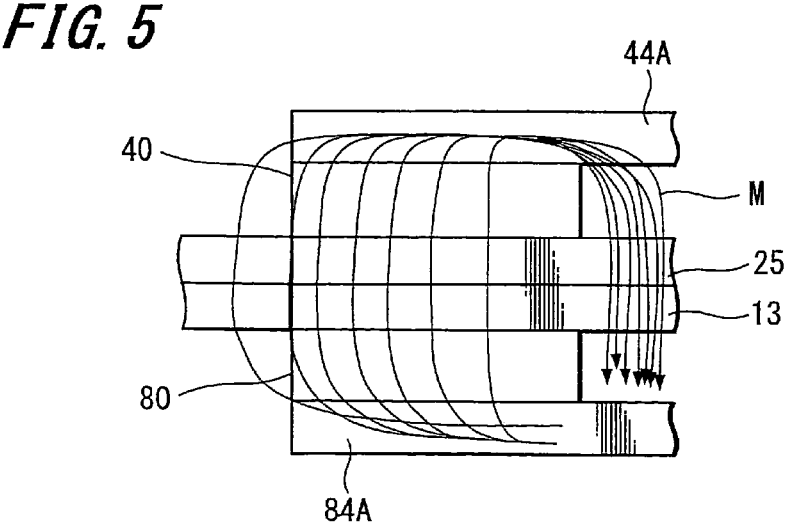
FIG. 5 is a diagram showing a portion of FIG. 4 in an enlarged manner, and showing the flow of magnetic flux formed between the two coils.
Figure 7:
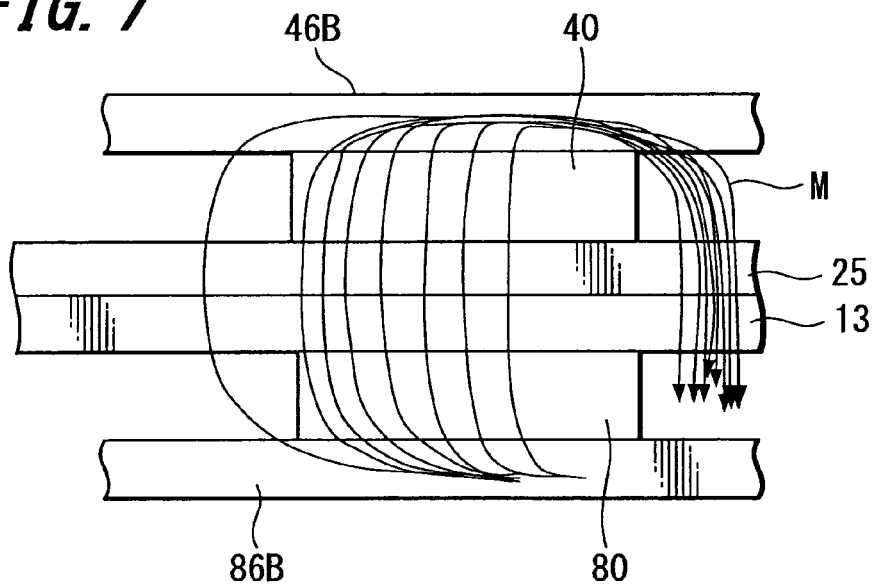
FIG. 7 is a diagram showing a portion of FIG. 6 in an enlarged manner, and showing the flow of magnetic flux formed between the two coils.
Figure 9:
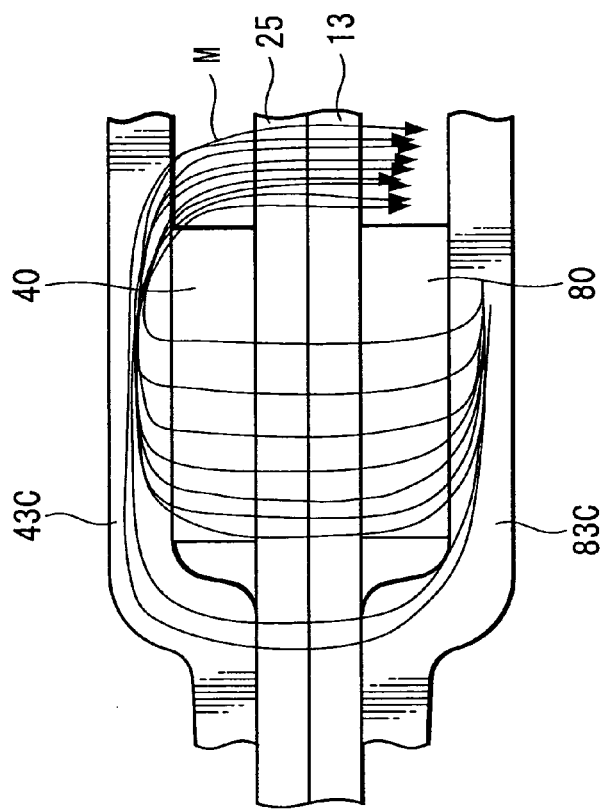
FIG. 9 is a diagram showing a portion of FIG. 8 in an enlarged manner, and showing the flow of magnetic flux formed between the two coils.

Further, FIG. 5 shows the portion surrounded by the ellipse E1 in FIG. 4 in an enlarged manner and also shows the flow of magnetic flux M formed by both the planar coils in the mobile phone unit and in the cradle. Similarly, FIG. 7 shows the portion surrounded by the ellipse E2 in FIG. 6 and also shows the flow of magnetic flux M formed by both the planar coils. FIG. 9 shows the portion surrounded by the ellipse E3 in FIG. 5 and also shows the flow of magnetic flux M formed by both the planar coils. In the examples of FIG. 5, FIG. 7 and FIG. 9, the direction of the magnetic flux M is drawn in one direction to simplify the drawing; however, because an AC voltage is used in actual power transmission, the direction of the flux M is inverted in alternation.

In FIG. 4 through FIG. 9, as shown in FIG. 4 and FIG. 5, for example, when magnetic sheets 44A, 84A of size substantially matching the shapes of the planar portions of the planar coils are affixed, the magnetic sheets exist only on the upper faces of the planar coils, so that a magnetic path is not formed efficiently, and the amount of linked magnetic flux is small. When, as shown in FIG. 6 and FIG. 7, for example, magnetic sheets 46B, 86B larger than the planar portions of the planar coils are affixed only to the planar portions of the planar coils, a magnetic path is formed which passes not only through the upper faces of the planar coils but also through the magnetic sheets 46B and 86B in positions outside the upper faces of the planar coils. However, because there is an interval opened between the two magnetic sheets 46B and 86B positioned at distances from the upper faces of the planar coils, and gap exists between the sheets, the magnetic path is not formed efficiently and the amount of linked magnetic flux is small. On the other hand, when as shown in FIG. 8 and FIG. 9, for example, the magnetic sheets 43C and 83C are affixed so as to cover the planar portions of the planar coils and the wall-face portions of the housing or similar, because the magnetic sheets 43C and 83C exist in the vicinity on the outer periphery of the planar coils, a magnetic path is formed which passes through these portions of the magnetic sheets 43C and 83C. However, in the examples of FIG. 8 and FIG. 9, because certain gaps occur between the magnetic sheets 43C, 83C and the planar coils at the outer periphery of the planar coils, to this extent the magnetic path is elongated and is not efficiently formed, and the amount of linked magnetic flux may not be large.

Figure 10:
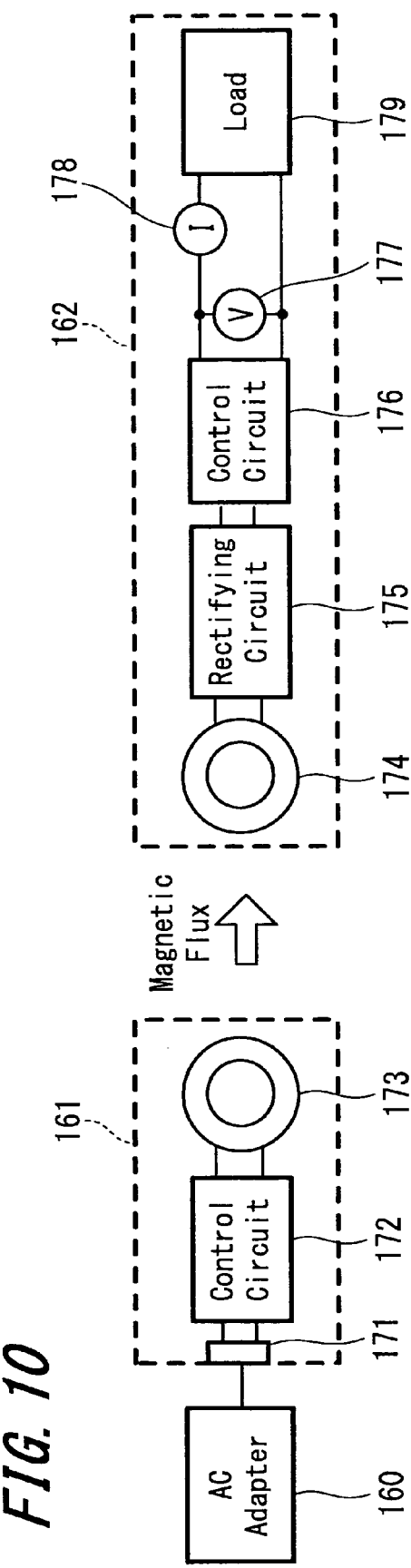
FIG. 10 is a block circuit diagram showing a characteristic comparison measurement circuit used to compare the output voltage and output current characteristics in noncontact power transmission.
Figure 11:
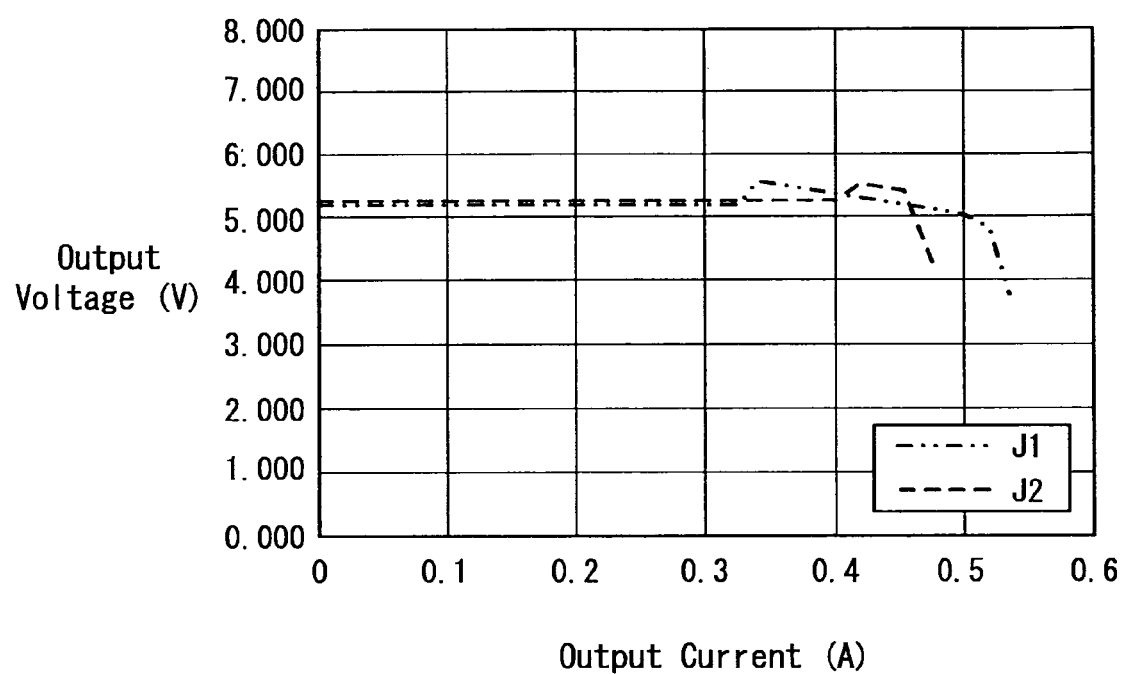
FIG. 11 is a diagram showing the comparison between the output voltage and output current characteristics for a noncontact power-transmission coil of the example of FIG. 8 and FIG. 9 (condition J1), and for a noncontact power-transmission coil of the example of FIG. 6 and FIG. 7 (condition J2).

Next, FIG. 11 is a diagram showing the characteristics on the output voltage and output current measured using the characteristic comparison measurement circuit shown in FIG. 10. The measurement is carried out for the noncontact power-transmission coils of an example (condition J1) in which the magnetic sheets 43C, 83C are affixed so as to cover the planar portions of the planar coils and the wall-face portions of the housing or similar as in FIG. 8 and FIG. 9. Further, the measurement is carried out for the noncontact power-transmission coils of an example (condition J2) in which the magnetic sheets 46B, 86B larger than the planar portions of the planar coils are affixed only onto the planar portions. Those results are then compared. Further, FIG. 12 is a diagram comparing the characteristics on the output current and power-transmission efficiency for the noncontact power-transmission coils of the example of FIG. 8 and FIG. 9 (condition J1) and for the noncontact power-transmission coils of the example of FIG. 6 and FIG. 7 (condition J2).

In the characteristic comparison measurement circuit shown in FIG. 10, DC power supplied from an AC adapter 160 is supplied via the connector 171 to a primary circuit 161. The control circuit 172 of the primary circuit 161 uses power supplied from the connector 171 to generate an AC voltage at a measurement reference frequency for supply to the primary coil 173. On the other hand, in the secondary circuit 162, the AC voltage from the primary coil 173 induces an AC voltage in the secondary-coil 174, and the AC voltage is converted into a DC voltage in the rectifying circuit 175. The DC voltage passes through the control circuit and is sent to an ammeter 178 and voltmeter 177 connected to a load 179. Using the characteristic comparison measurement circuit, characteristic comparison results for output voltage and output current are obtained as in FIG. 11 and FIG. 12.

Figure 12:
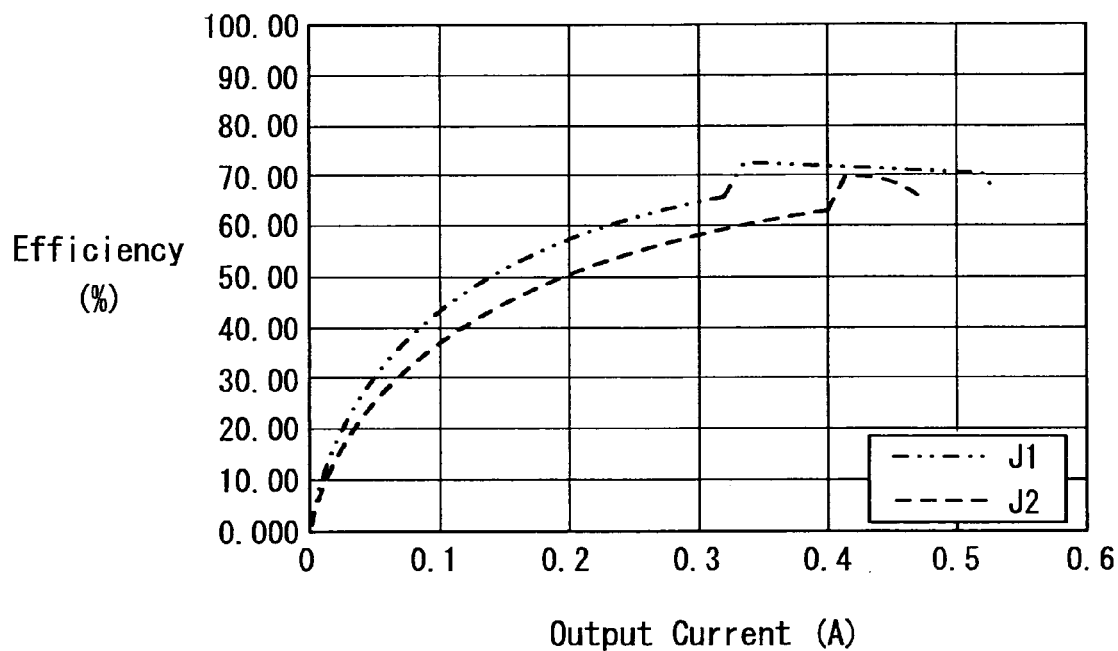
FIG. 12 is a diagram for comparing the output current and power-transmission efficiency characteristics for a noncontact power-transmission coil of the configuration example of FIG. 8 and FIG. 9 (condition J1), and for a noncontact power-transmission coil of the configuration example of FIG. 6 and FIG. 7 (condition J2).

That is, according to FIG. 11 and FIG. 12, in the case of magnetic sheets being affixed to the planar coils, a preferable result is obtained for transmission efficiency when affixing the magnetic sheets 43C, 83C which cover the entirety of the planar portions of the planar coils and the wall-face portions of the housing or similar. That is, when magnetic sheets 43C, 83C exist in the vicinity of the side-face portions of the planar coils as well, such preferable result may be obtained. However, even in a configuration in which the magnetic sheets 43C, 83C are affixed so as to cover the planar portions of the planar coils and the housing or other wall-face portions as shown in FIG. 8 and FIG. 9, the magnetic sheets 43C, 83C do not closely adhere to the side-face portions of the planar coils, and a certain gap occurs. Accordingly, to the extent of the gap, the efficiency of magnetic path formation is reduced.

Hence, in noncontact power-transmission coils according to the embodiment, a magnetic solution is applied onto the planar portions and side-face portions of the planar coils. For example, ferrite powder or another magnetic metal powder or similar is mixed into a binder solvent in which a rubber or epoxy resin is dissolved into a volatile solvent to obtain the magnetic solution. Accordingly, magnetic layers 45, 85 are formed which completely adhere closely not only to the planar portions, but also to the side-face portions of the planar coils, as shown in FIG. 13 and FIG. 14.

Figure 13:
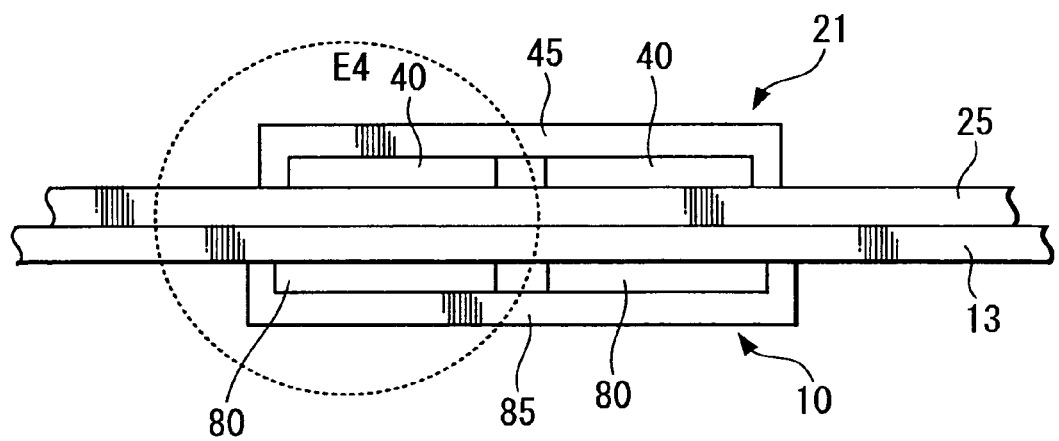
FIG. 13 is a schematic cross-sectional view of the portion in proximity to two noncontact power-transmission coils of an embodiment, positioned in proximity, in a mobile phone unit and in a cradle, formed by applying a magnetic layer to the planar portions and side-face portions of the planar coils.

FIG. 13 is a diagram schematically showing a cross-section of the portion in proximity to the coil of a mobile phone unit 2 of this embodiment, and of the portion in proximity to the coil (terminal mounting base) of the cradle 1. In the mobile phone unit, the noncontact power-transmission coil 21, with magnetic layer 45 applied to the planar portion and side-face portion of a planar coil formed from electric wire 40 which is single wire or twisted wire wound into a spiral shape, is affixed to the wall 25 of a battery lid. In the cradle 1, the noncontact power-transmission coil 10, with magnetic layer 85 applied to the planar portion and side-face portion of a planar coil of wound electric wire 80, is affixed to the housing wall 13. FIG. 14 shows the portion surrounded by the ellipse E4 in FIG. 13 in an enlarged manner, and also shows the flow of magnetic flux M formed by both planar coils in the mobile phone unit 2 and cradle 1. In the example of FIG. 14, the direction of the magnetic flux M is drawn in one direction to simplify the drawing; but because an AC voltage is used in actual power transmission, the direction of the flux M is inverted in alternation.

Figure 14:
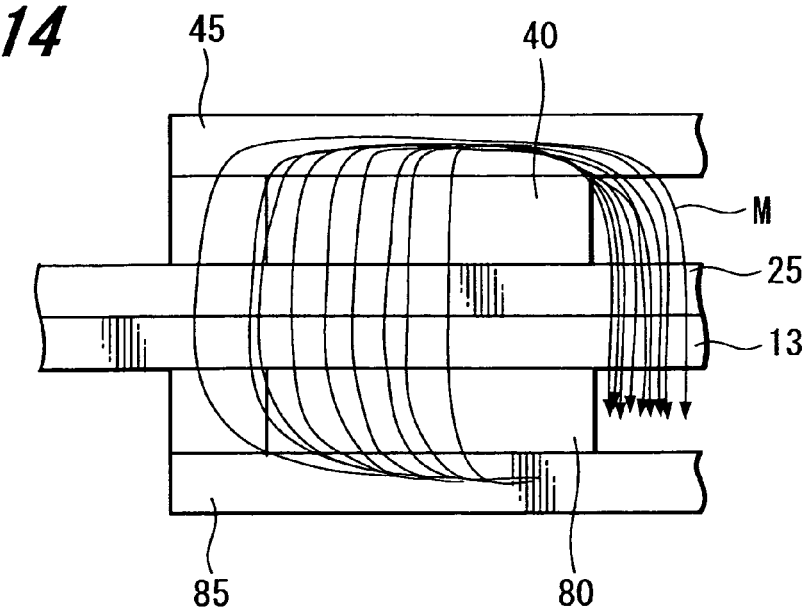
FIG. 14 is a diagram showing an enlarged-portion of FIG. 13 and the flow of magnetic flux formed between the two coils.

According to this embodiment, as shown in FIG. 13 and FIG. 14, magnetic layers are formed by application on the planar portions and side-face portions of the planar coils. Accordingly, magnetic layers closely adhere not only to the upper faces of the planar coils but also to the side-face portions, and moreover magnetic layers exist so as to completely adhere closely onto the depression/protrusion portions on the planar coils due to the electric wire windings. As a result, a magnetic path is formed efficiently, and a large amount of linked magnetic flux is formed. Hence, using the example of configuration shown in FIG. 13 and FIG. 14, the efficiency of power transmission by the noncontact power-transmission coils can be further increased.

Further, according to this embodiment, the magnetic layers are formed by application, the magnetic material adheres more firmly and closely to the electric wire, so that separation of the magnetic sheet as described above when affixing magnetic sheet using an adhesive sheet or similar does not occur, and power-transmission characteristics can be stabilized.

Further, according to this embodiment, the magnetic layers are formed by application, so that there is no longer a need to use an adhesive sheet having a certain thickness and elasticity as explained above. As a result, the noncontact power-transmission coils can be made extremely thin. Hence according to this embodiment, the thickness of a mobile phone unit or similar provided with this noncontact power-transmission coil can also be reduced.

Moreover, according to this embodiment, a planar coil on which a magnetic layer has been formed by application is handled as a unit of noncontact power-transmission coil. Hence, processes such as affixing a magnetic sheet as described above may be unnecessary and, for example, processes can be eliminated and handling may be simplified when assembling mobile phone units and similar.

[Example of Formation of Magnetic Layer by Application to Side-Face Portion of Planar Coil of Electric Wire Windings]

Figure 15:
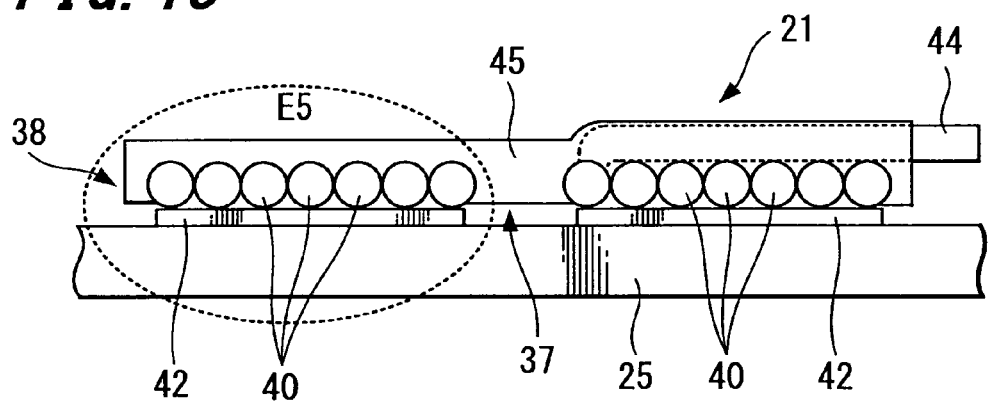
FIG. 15 is a schematic cross-sectional view of a noncontact power-transmission coil of an embodiment, devised such that the electric wire end portion at the inner-periphery portion of the planar coil passes over (or under) the planar coil and is drawn to the outer-periphery side.
Figure 16:
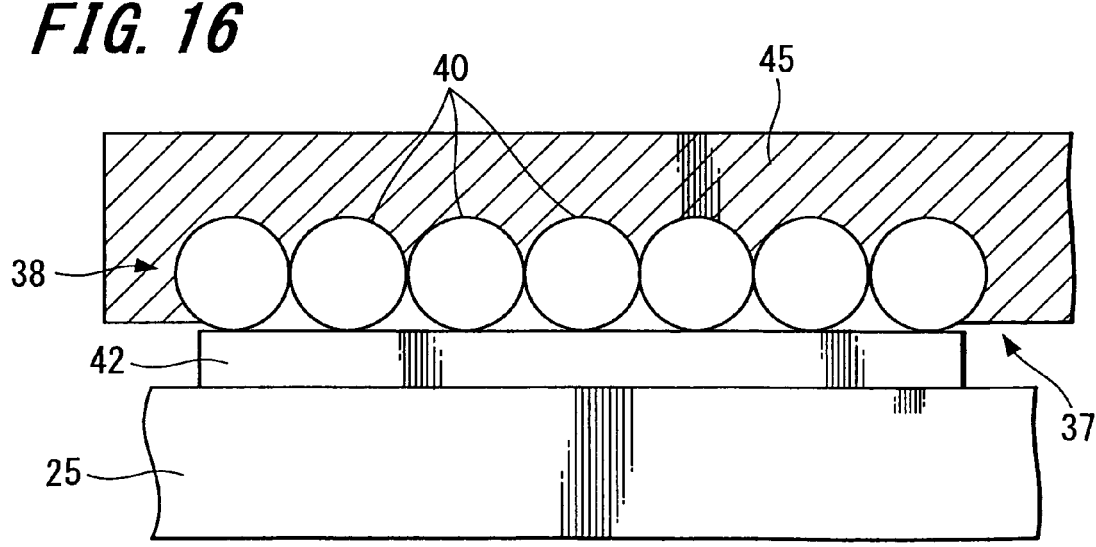
FIG. 16 is a diagram showing an enlarged-portion of FIG. 15.

FIG. 15 and FIG. 16 show an example of the configuration of a noncontact power-transmission coil 21 of this embodiment, in which, as in the example of the above-described FIG. 1, a magnetic layer is formed by application onto the planar portion and side-face portion of a planar coil formed by winding electric wire 40 into a spiral shape. In each of the embodiments explained below, examples are mainly provided for the noncontact power-transmission coil (secondary transmission coil 21) mounted in the mobile phone unit 2.

The example of FIG. 15 shows a schematic cross-section of the noncontact power-transmission coil 21 of this embodiment. The noncontact power-transmission coil 21 has a planar coil in which electric wire 40 that is a single wire or twisted wire is wound in a spiral shape in the same plane. The electric wire end portion on an outer-periphery portion (for example, the electric wire end portion at the end of the windings) 38 of the planar coil is directly drawn to the outside. The electric wire end portion 44 on an inner-periphery portion (for example, the electric wire end portion at the beginning of the windings) 37 is passed over (or under) the electric wire portion wound into the spiral shape and drawn to the outer periphery portion 38. FIG. 16 shows the portion surrounded by the ellipse E5 shown in FIG. 15 in an enlarged manner.

In the noncontact power-transmission coil 21 shown in FIG. 15 and FIG. 16, the magnetic layer 45 is formed by application so as to cover, at least, the top of the planar portion of the planar coil on the side on which the electric wire end portion 44 of the inner-periphery portion 37 is drawn to the outer-periphery portion 38, and the side-face portion of the planar coil. Further, the magnetic layer 45 is also applied to the central hole portion of the inner-periphery portion 37 of the spiral-shape electric wire 40 of the planar coil, and is formed so as to substantially fill this central hole portion. In addition, in this noncontact power-transmission coil 21, an adhesive sheet 42 or similar is used to affix the planar portion side on which the magnetic layer 45 is not formed to the inner-wall face of the battery lid 20 of the mobile phone unit 2 of this embodiment. Also, although not shown, a metal sheet of aluminum or similar is also affixed to the outside of the magnetic layer 45.

According to the noncontact power-transmission coil shown in FIG. 15 and FIG. 16, the magnetic layer 45 is formed to closely adhere not only to the upper face of the planar coil, but also to the side-face portion. Further, the magnetic layer 45 exists so as to completely adhere closely to the depression/protrusion portions due to the electric wire 40 wound into the planar coil. Therefore, a magnetic path is formed efficiently, and a large amount of linked magnetic flux is formed. Further, because the magnetic layer 45 is formed by application, manufacturing processes can be reduced, handling can be simplified, and characteristics can be stabilized, compared with cases in which a magnetic sheet is affixed.

[Example of Formation of Electric Wire Draw-Out Portion Using Flexible Printed-Circuit Board]

Figure 17:
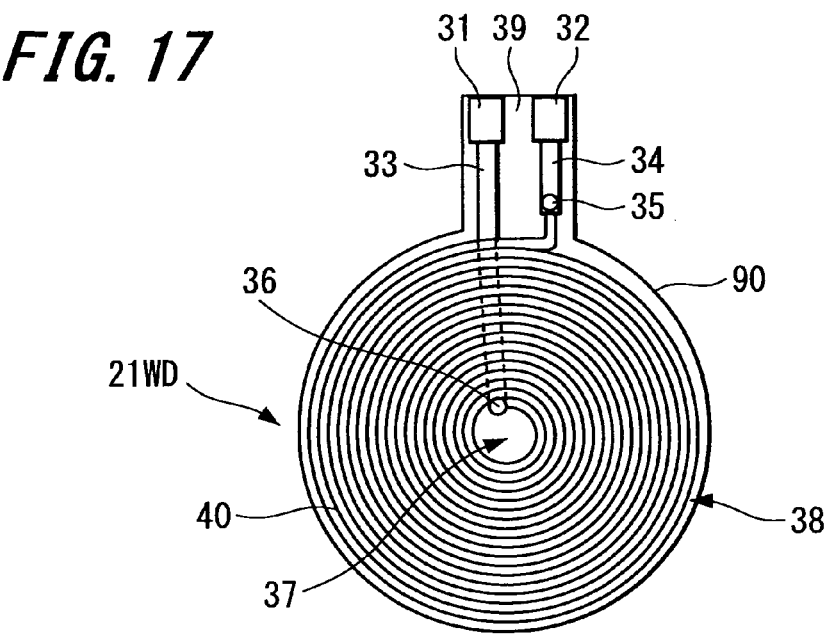
FIG. 17 is a schematic diagram showing from the front a noncontact power-transmission coil, prepared by affixing a planar coil, formed by winding an electric wire in a spiral shape, onto a flexible printed-circuit board with a shape substantially matching the planar coil.
Figure 18:
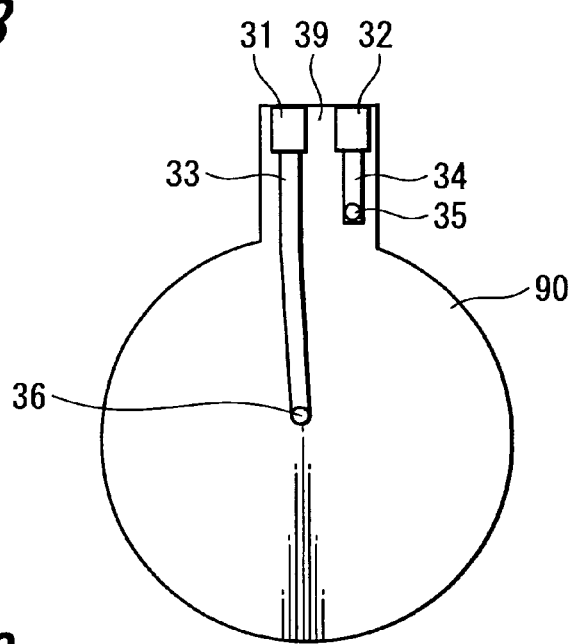
FIG. 18 is a schematic diagram showing from the front the flexible printed-circuit board of FIG. 17, with the planar coil affixed.
Figure 19:
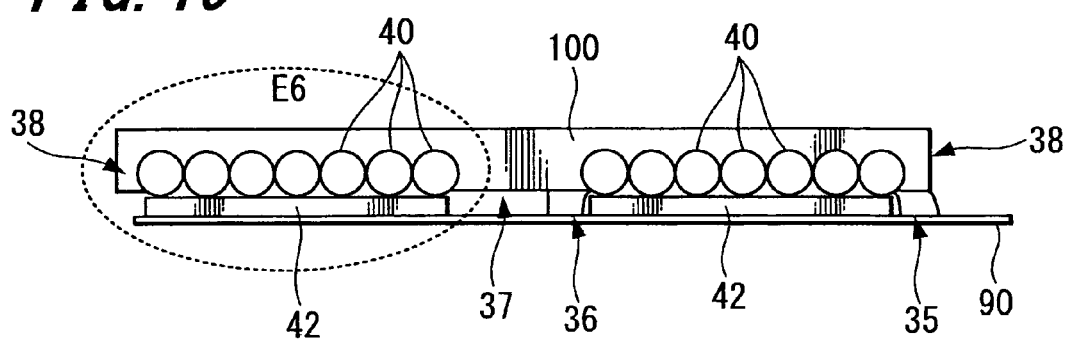
FIG. 19 is a schematic cross-sectional view of the noncontact power-transmission coil of FIG. 17, with a magnetic layer formed on a planar portion and side-face portion of the planar coil.
Figure 20:
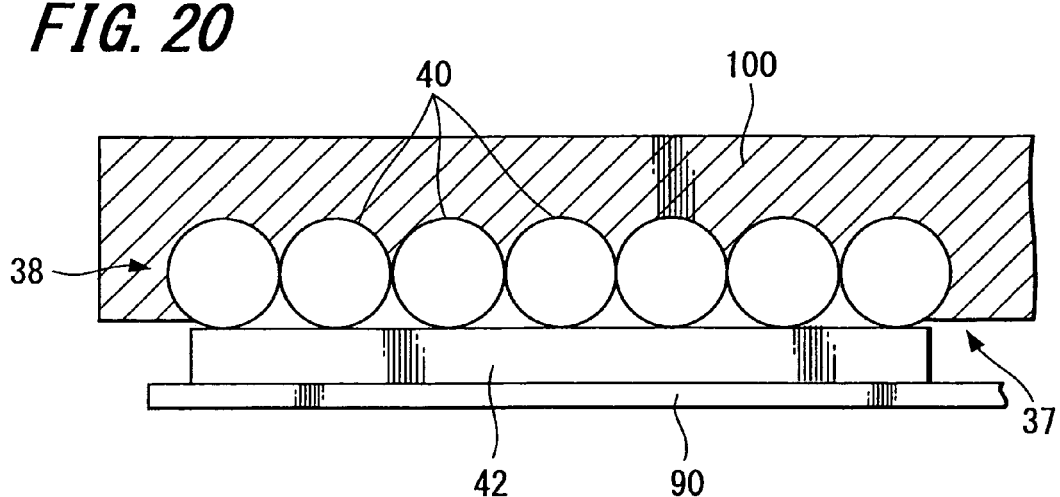
FIG. 20 is a partially-enlarged view of the noncontact power-transmission coil of FIG. 19.

FIG. 17 through FIG. 20 show an example of the configuration of a noncontact power-transmission coil 21WD of an embodiment. In the noncontact power-transmission coil 21WD, a magnetic layer is formed by application on both the planar portion and the side-face portion of a planar coil in which electric wire 40 is wound in a spiral shape. Further, the electric wire end portion of the inner-periphery portion 37 of the electric wire 40 (for example, the electric wire end portion at the beginning of the windings) is drawn out to the outer-periphery portion 38 using a flexible printed-circuit board 90. FIG. 17 is a diagram schematically showing, from the front, the state in which the planar coil is affixed onto the board 90. FIG. 18 is a diagram schematically showing, from the front, the board 90 in a state in which the planar coil is not affixed. FIG. 19 shows a schematic cross-sectional view of the noncontact power-transmission coil 21WD of this embodiment. FIG. 20 shows the portion surrounded by the ellipse E6 shown in FIG. 19 in an enlarged manner.

As shown in FIG. 17 through FIG. 20, the planar portion on one side of the planar coil formed by winding the electric wire 40 of the noncontact power-transmission coil 21WD of this embodiment is affixed, for example, using an adhesive sheet 42, to the surface of the flexible printed-circuit board 90. Further, a magnetic layer 100 is formed by applying the magnetic solution to the other planar portion and to the side-face portion of the planar coil. The magnetic layer 100 is also applied to the central hole portion at the inner-periphery portion 37 of the spiral-wound electric wire 40 of the planar coil, so that the central hole portion is substantially filled. Also, although not shown, a metal sheet of aluminum or similar is affixed if necessary to the outside of the magnetic layer 100. Further, the face of the flexible printed-circuit board 90 on the side opposite the face to which the noncontact power-transmission coil 21WD is affixed is affixed to the inner-wall face of the battery lid 20 of the mobile phone unit 2, using an adhesive sheet or similar, not shown.

The flexible printed-circuit board 90 is an extremely thin sheet-shape board employing a polyimide resin or similar as the base material. On the surface is formed an insulating layer, and moreover the board has a shape which substantially matches the planar portion of the planar coil. On the flexible printed-circuit board 90 according to this embodiment, the surface insulating layer is not formed on a first coil connection portion 36 positioned in the inner-periphery portion 37 of the planar coil, on a second coil connection portion 35 positioned in the outer vicinity of the planar coil outer periphery 38, on a first external connection terminal portion 31 and on a second external connection terminal portion 32. Hence, an inner conductor of the flexible printed-circuit board 90 is exposed to the outside. The first coil connection portion 36 and first external connection terminal portion 31 are electrically connected via a first inner conductor pattern 33 formed below the surface insulating layer, and the second coil connection portion 35 and second external connection terminal portion 32 are electrically connected via a second inner conductor pattern 34 formed below the surface insulating layer. When the planar coil is affixed to the flexible printed-circuit board 90, the winding-beginning electric wire end portion in the inner-periphery portion 37 of the planar coil is electrically connected to the first coil connection portion 36. The winding-ending electric wire end portion of the outer-periphery portion 38 of the planar coil is electrically connected to the second coil connection portion 35. In the case of this embodiment, as shown in FIG. 17 and FIG. 18, the flexible printed-circuit board 90 has a protruding portion 39, and the first external connection terminal portion 31 and second external connection terminal portion 32 are positioned on this protruding portion 39. However, the shape of the protruding portion 39 is not limited to the example shown in FIG. 17 and FIG. 18.

As explained above, using the noncontact power-transmission coil 21WD shown in FIG. 17 through FIG. 20, the first coil connection portion 36 and first external connection terminal portion 31 are electrically connected via the first inner conductor pattern 33 of the flexible printed-circuit board 90. The second coil connection portion 35 and second external connection terminal portion 32 are electrically connected via the second inner conductor pattern 34 of the flexible printed-circuit board 90. Hence, the noncontact power-transmission coil 21WD can be made extremely thin compared with a configuration example in which the electric wire end portion 44 of the inner-periphery portion 37 is drawn to the side of the outer periphery portion 38 over (or under) the electric wire portion wound into the planar coil, as in the example shown in FIG. 15.

Further, in the noncontact power-transmission coil 21WD of FIG. 17 through FIG. 20, the magnetic layer 100 is formed by application so as to completely adhere closely to the planar portion and side-face portion of the planar coil, and also in the depressions/protrusions of the planar coil due to the windings of the electric wire 40. Accordingly, a magnetic path is formed efficiently with the noncontact power-transmission coil in the cradle 1 during charging of the mobile phone unit 2, and a large amount of linked magnetic flux is formed, so that efficient power transmission is possible. Also, because the magnetic layer 100 is formed by application, manufacturing processes can be reduced, handling can be simplified, and characteristics can be stabilized, compared with cases in which a magnetic sheet is affixed.

[Example of Formation of a Planar Coil Using Multilayer Flexible Printed-Circuit Boards]

Figure 21:
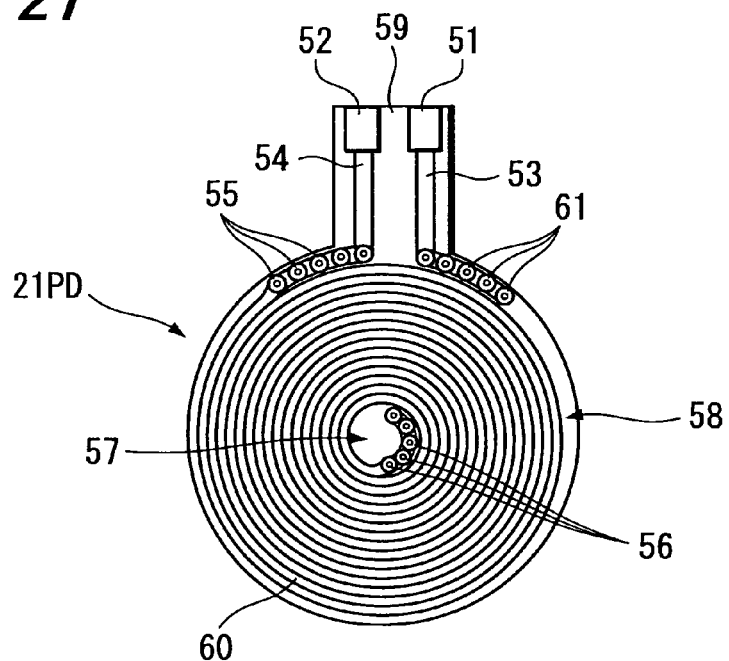
FIG. 21 is a schematic diagram showing from the front a noncontact power-transmission coil, having a multilayer flexible printed-circuit board in a shape substantially matching the planar coil pattern formed of a spiral-shape conductor pattern.
Figure 22:
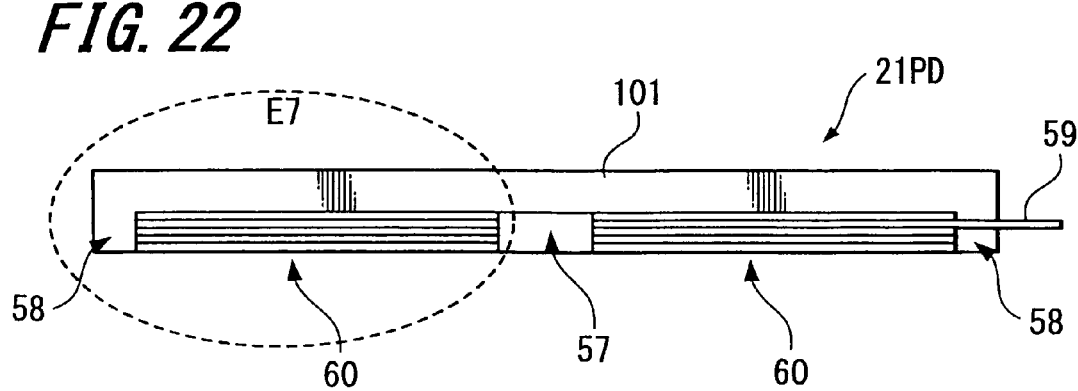
FIG. 22 is a schematic cross-sectional view of the noncontact power-transmission coil of FIG. 21, with a magnetic layer formed on a planar portion and side-face portion of the planar coil on the multilayer flexible printed-circuit board.
Figure 23:
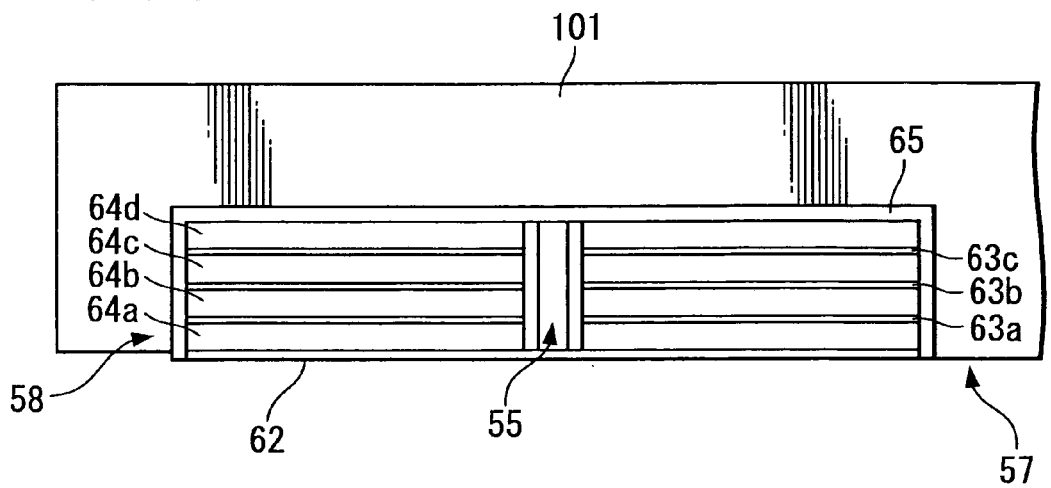
FIG. 23 is partly-enlarged view of the noncontact power-transmission coil of FIG. 22.

FIG. 21 through FIG. 23 show a schematic configuration of a noncontact power-transmission coil 21PD with a multilayer structure, in which a plurality of flexible printed-circuit boards, in each of which is formed a planar coil pattern from a spiral-shape conductor pattern, are laminated. FIG. 21 is a schematic diagram, seen from the front, the noncontact power-transmission coil 21PD formed from flexible printed-circuit boards having a multilayer structure. FIG. 22 is a schematic cross-sectional view of the noncontact power-transmission coil 21PD of the embodiment, formed from flexible printed-circuit boards and having a multilayer structure. FIG. 23 shows the portion surrounded by the ellipse E7 shown in FIG. 22 in an enlarged manner.

As shown in FIG. 21 through FIG. 23, the noncontact power-transmission coil 21PD of this embodiment has a four-layer construction, for example. The first layer board 64a, second layer board 64b, third layer board 64c, and fourth layer board 64d are each sheet-shaped boards of, for example, a polyimide resin or other base material, on which is formed a linear conductor pattern 60 in a spiral shape. On the surface of the first layer board 64a which is the uppermost layer, a surface insulating layer 62 is formed. Between the first layer board 64a and second layer board 64b, an adhesive layer and interlayer insulating layer 63a are formed. Similarly, an adhesive layer and interlayer insulating layer 63b are formed between the second layer board 64b and third layer board 64c, and an adhesive layer and interlayer insulating layer 63c are formed between the third layer board 64c and the fourth layer board 64d. At least an insulating layer 65 is formed on the rear side of the lowermost fourth layer board 64d and on the side-face portion of the multilayer flexible printed-circuit board. In addition, a magnetic layer 101 is formed on the outside of the insulating layer 65, by application of a magnetic solution similar to the above. In the noncontact power-transmission coil 21PD of this embodiment, by performing machining or similar to open a hole slightly smaller than the inner peripheral portion 57 in the spiral-shape conductor pattern 50, a central hole is formed. The magnetic layer 101 is also applied to this central hole portion, formed such that the central hole portion is substantially filled. Also, although not shown, a metal sheet of aluminum or similar is also affixed if necessary to the outside of the magnetic layer 101. Further, the surface side of the surface insulating layer 62 is affixed to the inner-wall face of the battery lid 20 of the mobile phone unit 2 using an adhesive sheet, not shown.

Further, in the noncontact power-transmission coil 21PD of this example, the pattern end portions (winding-beginning end portions) in the inner peripheral portions 57 of each conductor pattern 60 of the first layer board 64a through fourth layer board 64d are electrically connected via first through-holes 56. The pattern end portions (winding-ending end portions) in the outer peripheral portions 58 of each of the conductor patterns 60 of the first layer board 64a through fourth layer board 64d are electrically connected via second through-holes 55. The first through-holes 56 in the inner peripheral portion 57 of the conductor pattern 60 in each layer are electrically connected to through-holes 61 in the outer peripheral portion 58 of the conductor pattern 60 in each layer. Further, in this noncontact power-transmission coil 21PD, for example, the second through-hole 55 of the fourth layer board 64d is electrically connected to the second external connection terminal portion 52 via the second inner conductor pattern 54, and the first through-hole 56 of the fourth layer board 64d is electrically connected to the first external connection terminal portion 51 via the through-hole 61 and the first inner conductor pattern 53. In the case of this embodiment, as shown in FIG. 21, the multilayer-structure flexible printed-circuit board has a protruding portion 59, and the first external connection terminal portion 51 and second external connection terminal portion 52 are positioned on this protruding portion 59; but the shape of the protruding portion 59 is not limited to the example of FIG. 21.

As explained above, according to the noncontact power-transmission 21PD of the embodiment shown in FIG. 21 through FIG. 23, planar coils are formed from conductor patterns 60 on a multilayer flexible printed-circuit board which is extremely thin compared with electric wire. In addition, the pattern end portions of the inner peripheral portions 57 of the conductor patterns 60 are connected to the first external connection terminal portion 51 via the first through-holes 56, through-holes 61, and first inner conductor pattern 53. Similarly, the pattern end portions of the outer peripheral portions 58 of the conductor patterns 60 are connected to the second external connection terminal portion 52 via the second through-holes 55 and second inner conductor pattern 54, so that the noncontact power-transmission coil 21PD can be made extremely thin.

Figure 2:
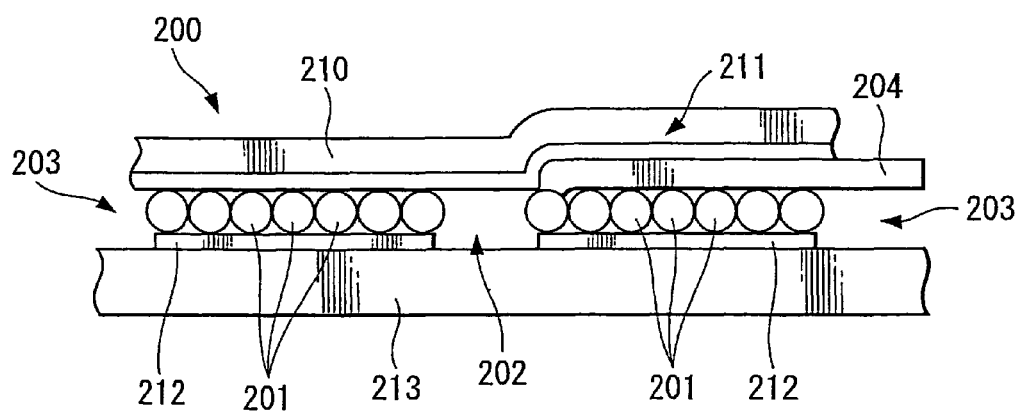
FIG. 2 is a schematic cross-sectional view of the planar coil in FIG. 1.

As explained above, using the noncontact power-transmission coil 21PD of this embodiment shown in FIG. 21 through FIG. 23, conductor patterns 60 on multilayer flexible printed-circuit board are used to form a planar coil which is extremely thin compared with electric wire. The pattern end portion (winding-beginning pattern end portion) in the inner peripheral portion 57 of each conductor pattern 60 of the planar coil is electrically connected to the first through-hole 56 and first external connection terminal portion 51, via the through-hole 61 and first inner conductor pattern 53. similarly, the pattern end portion (winding-ending pattern end portion) in the outer peripheral portion 58 of each conductor pattern of the planar coil is electrically connected to the second through-hole 55 and second external connection terminal portion 52 via the second inner conductor pattern 54. Accordingly, there is no portion in which electric wire overlaps as in the above-described FIG. 1 and FIG. 2, and hence the noncontact power-transmission coil 21PD can be made extremely thin.

Further, in the noncontact power-transmission coil 21PD shown in FIG. 21 through FIG. 23, the magnetic layer 101 is formed by application so as to completely adhere closely to the planar portion and side-face portion of the planar coil pattern. Consequently, a magnetic path is efficiently formed with the noncontact power-transmission coil of the cradle 1 during charging of the mobile phone unit 2, the amount of linked flux formed is large, and highly efficient power transmission is possible.

[Explanation of Magnetic Layer Formed in Central Hole Portion of Planar Coil Inner Periphery]

In the noncontact power-transmission coils 21, 21WD explained using the above-described FIG. 15 through FIG. 20, the magnetic layers 45, 100 are formed so as to substantially fill the central hole portions in the inner peripheral portions 37 of the planar coils formed by winding electric wire 40. In the noncontact power-transmission coil 21PD of the embodiment explained using FIG. 21 through FIG. 23, the magnetic layer 101 is formed so as to substantially fill the central hole portion opened in the inner peripheral portion 57 of the planar coil of the multilayer flexible printed-circuit board. Hence, using the noncontact power-transmission coils of each of these embodiments, magnetic flux can be concentrated by the magnetic layer in the central hole portion, a magnetic path can be formed efficiently, and a large amount of linked magnetic flux is formed, so that efficient power transmission is possible.

Here, in order to efficiently form a magnetic path, it is desirable that a magnetic layer be formed so as to substantially completely fill the central hole portion, as described above. However, at the time of application of the magnetic layer the central hole portion may be used as a hole for positioning when fixing the planar coil in a jig. Further, the central hole portion may be used for positioning when incorporating the noncontact power-transmission coil into the mobile phone unit or similar. In those cases, only a part of the central hole portion may be filled with the magnetic layer (midway in the planar coil thickness direction), without completely filling the central hole portion with the magnetic layer.

Figure 24:
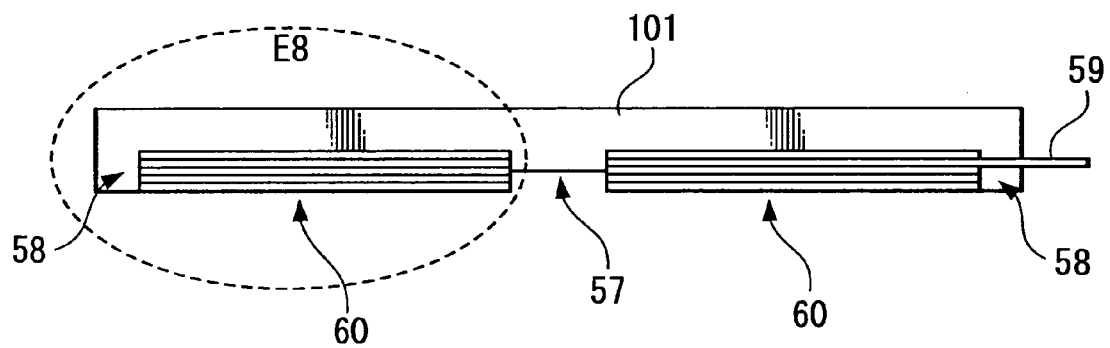
FIG. 24 is a schematic cross-sectional view of a noncontact power-transmission coil, with a magnetic layer formed up to midway through a hole provided in the planar coil inner-periphery portion of a multilayer flexible printed-circuit board in a shape substantially matching the planar coil pattern formed of a spiral-shape conductor pattern.
Figure 25:
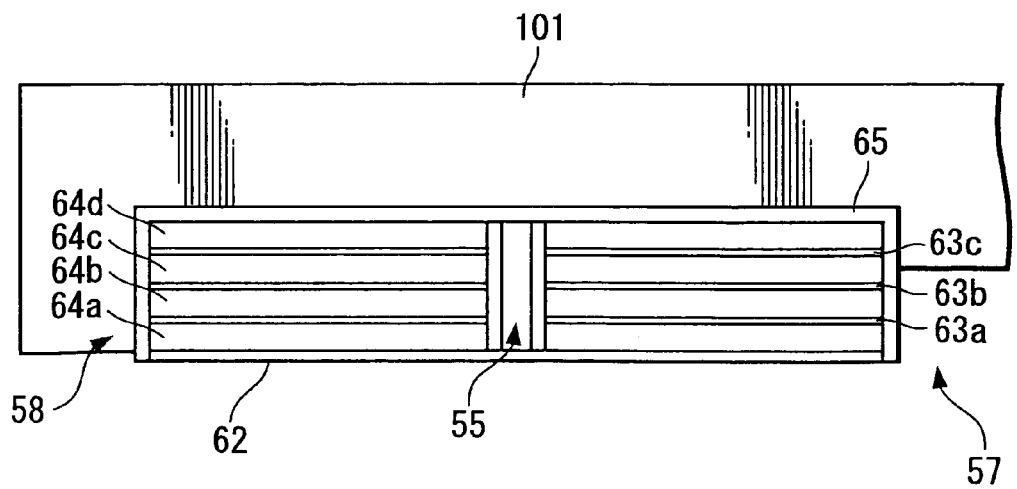
FIG. 25 is a partly-enlarged view of the noncontact power-transmission coil of FIG. 24.
Figure 26:
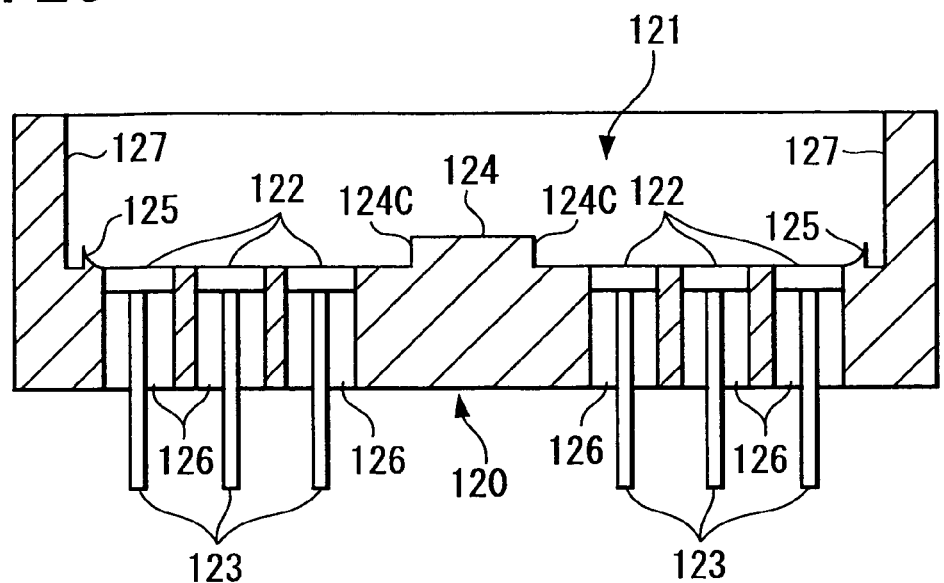
FIG. 26 is a schematic cross-sectional view shown from a side face of principal portions of a magnetic layer formation device of an embodiment, which is capable of forming a magnetic layer on a planar portion and on a side-face portion of a planar coil by injecting a magnetic solution.

FIG. 24 and FIG. 25 show a schematic configuration of a noncontact power-transmission coil in which the magnetic layer 101 is formed in a part of the central hole portion opened in, for example, a multilayer flexible printed-circuit board planar coil. FIG. 24 is a schematic cross-sectional view of the noncontact power-transmission coil of the example. FIG. 25 shows the portion surrounded by the ellipse E8 shown in FIG. 24 in an enlarged manner.

[Explanation of Magnetic Layer Formation Device and Magnetic Layer Formation Process for Noncontact Power-Transmission Coil]

Hereinafter, the configuration of a magnetic layer formation device, which forms a magnetic layer on the planar portion and on the side-face portion of a planar coil by applying a magnetic solution as described above, and the magnetic layer formation processes for the magnetic layer formation device, are explained. In the following explanation, an example is described in which the magnetic layer formation device and magnetic layer formation processes are employed when applying a magnetic solution to a planar coil formed by winding electric wire 40 in a spiral shape.

Figure 27:
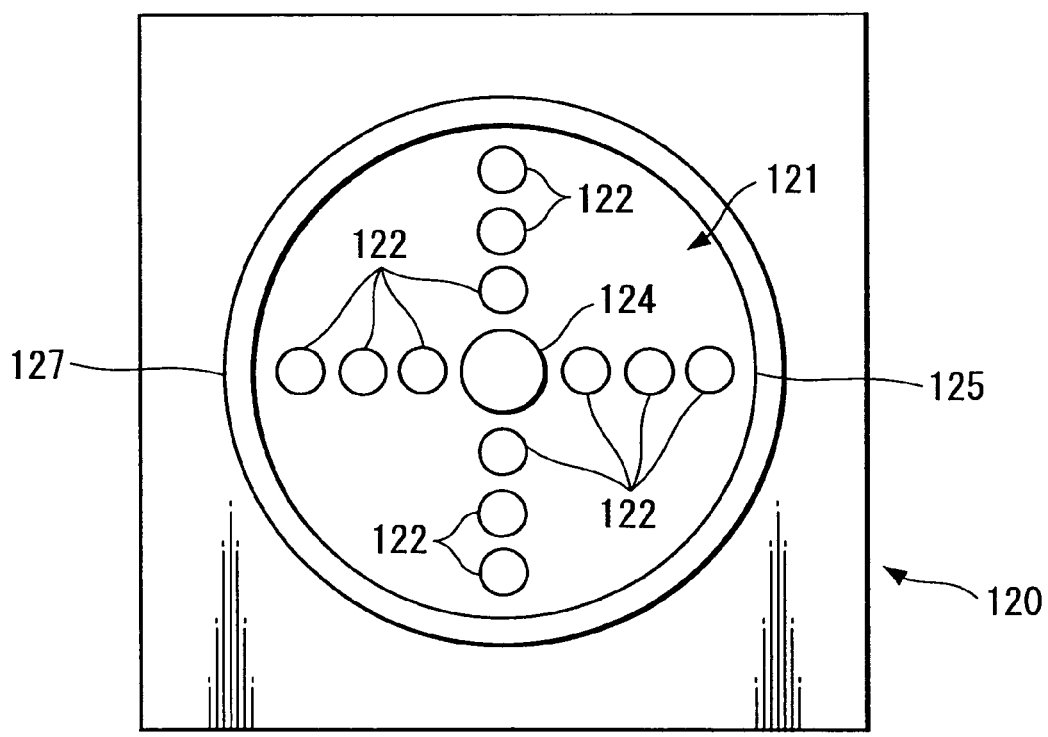
FIG. 27 is a schematic front view of a magnetic layer formation device, seen from the side from which the planar coil is fitted.
Figure 32:
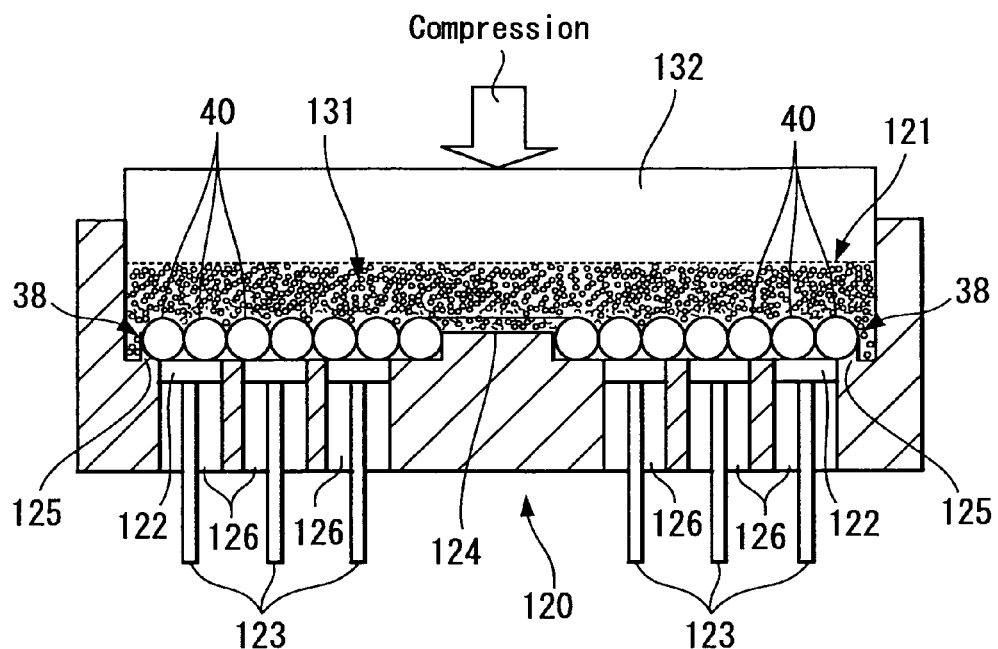
FIG. 32 is a diagram showing a state in which a magnetic solution, injected into the planar coil-fitting portion of the magnetic layer formation device of an embodiment, is being compression-molded.
Figure 33:
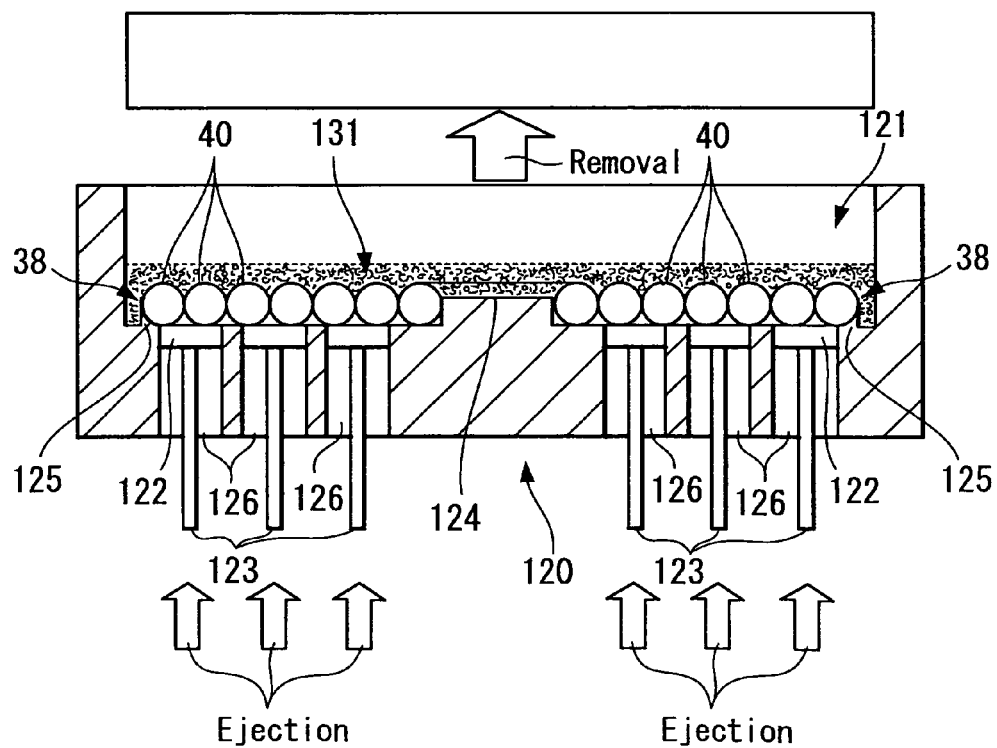
FIG. 33 is a diagram showing a state in which a magnetic solution, injected into the planar coil-fitting portion of the magnetic layer formation device of an embodiment, has been completely compression-molded.
Figure 34:
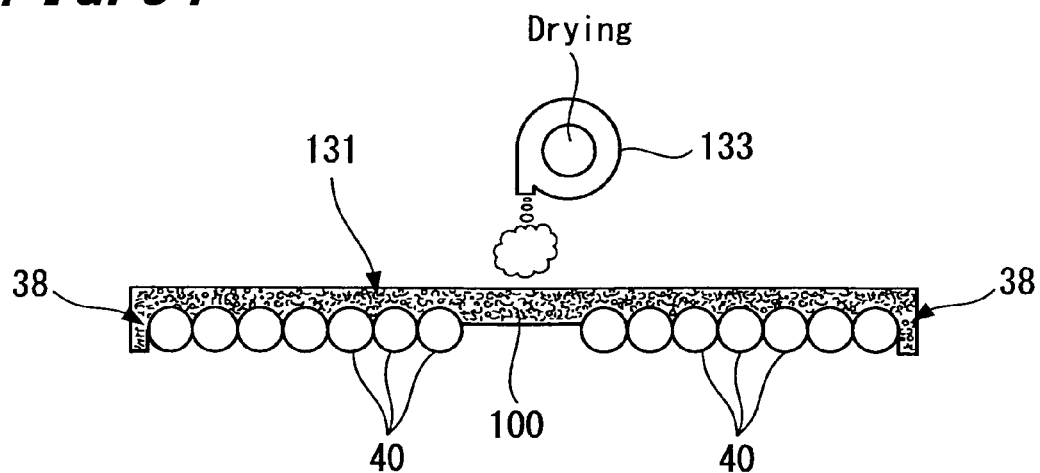
FIG. 34 is a diagram showing a process of drying a planar coil to which a magnetic solution has been applied in an embodiment.

FIG. 26 through FIG. 34 show a schematic configuration of principal portions of a magnetic layer formation device 120 and the magnetic layer formation processes in which, by injecting a magnetic solution, a magnetic layer can be formed on a planar portion and on the side-face portion of a planar coil. FIG. 26, and FIGS. 28 through 33 are schematic cross-sectional views, seen from a side, of the magnetic layer formation device 120. FIG. 27 is a schematic front view of the magnetic layer formation device 120, seen from the side from which the planar coil is fitted. FIG. 34 shows a state in which a magnetic layer is formed on a planar coil using the magnetic layer formation processes of this embodiment. The number, positioning, and shapes of the plurality of ejection pins (ejection pin heads 122, ejection pin columns, ejection pin holes 126) are examples, and the invention is not limited to these examples.

As shown in FIG. 26 through FIG. 33, a planar coil-fitting portion 121 has a bottom-face portion and an inner-wall portion 127 and is formed into a substantially cylindrical depression of predetermined depth greater than the thickness of the planar coil. In the bottom-face portion, one planar portion of the planar coil, formed by winding electric wire 40 in a spiral shape, is mounted, with the planar coil positioned. The wall portion 127 has the shape substantially similar to the outer-perimeter shape of the planar coil, but has the diameter greater by a predetermined length than the diameter of the outer-periphery portion 38 of the planar coil. Further, the predetermined length in the planar coil-fitting portion 121 is a value determined by the thickness of the magnetic layer resulting from application to the outside peripheral portion (side-face portion of the planar coil) of the electric wire 40 on the outer periphery 38 of the planar coil. The predetermined depth is a value determined by the thickness of the magnetic layer applied onto the electric wire 40 in the planar portion of the planar coil. In the center portion of the bottom-face portion of the cylindrical depression of the planar coil-fitting portion 121 is provided a cylindrical-shape protruding portion 124. The cylindrical-shape protruding portion 124 determines the planar coil fitting position and has an outer-periphery portion 124C of diameter substantially close contact with the inner-periphery portion 37 of the planar coil (with diameter slightly smaller than the diameter of the inner-periphery portion 37), when the planar coil is fitted. Moreover, the cylindrical-shape protruding portion 124 is lower by a predetermined thickness than the thickness of the planar coil. The predetermined thickness in this planar coil-fitting portion 121 is a value determined by the thickness of the magnetic layer applied so as to fill the inner-periphery portion 37 of the planar coil. Further, in the bottom-face portion in the vicinity of the inner-wall portion 127 of the planar coil-fitting portion 121 is formed a circular protruding portion 125. The circular protruding portion 125 determines the planar coil fitting position. The circular protruding portion 125 is lower by a predetermined thickness than the planar coil thickness and has a curved shape such that, when the planar coil is loaded, the electric wire 40 on the side of the outer periphery 38 of the planar coil is substantially in close contact from the circular-shape contact position contact with the bottom-face portion to the outer-periphery portion of the electric wire 40, that is, to the end of the outer-periphery portion 38 of the planar coil. The predetermined thickness in the planar coil-fitting portion 121 is a value which determines the magnetic layer height on the side of the outer periphery 38 of the planar coil from the plane position of the magnetic layer applied to the planar portion of the planar coil.

Further, a plurality of ejection pin portions are provided in the bottom-face portion of the planar coil-fitting portion 121. Each of the plurality of ejection pins has an ejection pin head 122, ejection pin column 123, and ejection pin hole 126.

The ejection pin holes 126 are, for example, cylindrical in shape, and are formed so as to penetrate from the bottom-face portion of the planar coil-fitting portion 121 to the bottom portion of the magnetic layer formation device 120. The ejection pin heads 122 have diameter slightly smaller than the diameter of the ejection pin holes 126 in the bottom-face portion of the planar coil-fitting portion 121, and are of cylindrical shape having an outer periphery which slides against the inner wall of the ejection pin holes 126. In the case of the example shown in FIG. 26 and other figures, the diameter of the cylindrical shape of the ejection pin hole 126 is made to be the same diameter from the bottom-face portion of the planar coil-fitting portion 121 to the bottom portion of the magnetic layer formation device 120. However, the diameter on the side lower than the portion in which the ejection pin heads 122 match the bottom portion of the planar coil-fitting portion 121 (the bottom side of the magnetic layer formation device 120) may be smaller than the outer-periphery diameter of the ejection pin heads 122 (and may be larger than the diameter of the ejection pin columns 123). Accordingly, plane positioning such that the head plane position of the ejection pin heads 122 is substantially the same as the bottom-face plane position of the planar coil-fitting portion 121 is possible, and the ejection pin heads 122 can be prevented from falling into the bottom side of the magnetic layer formation device 120. The ejection pin column 123 is formed from a column-shaped member such that one end is fixed to the rear face of an ejection pin head 122 (the face opposite the side of the bottom portion of the planar coil-fitting portion 121), and the other end is formed to protrude from the bottom portion of the magnetic layer formation device 120. In the magnetic layer formation device 120 of this embodiment, the other ends of the ejection pin columns 123 are capable of pressing the ejection pin columns 123 into the side of the planar coil-fitting portion 121 if necessary, using an ejection mechanism, not shown.

Figure 28:
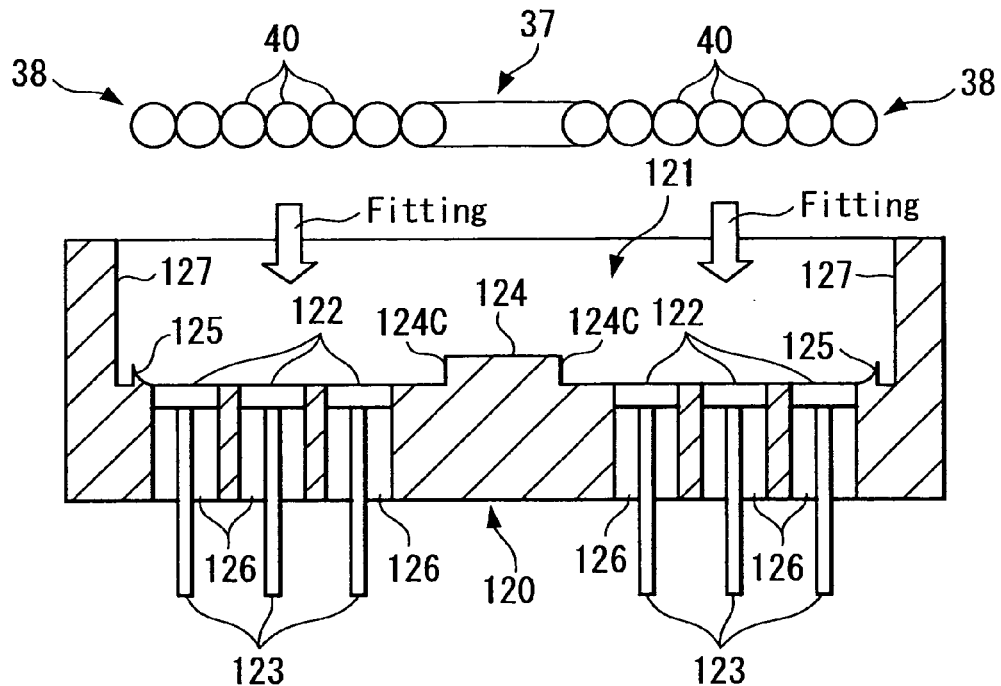
FIG. 28 is a diagram showing a state in which a planar coil is fitted into a planar coil-fitting portion of the magnetic layer formation device of an embodiment.
Figure 29:
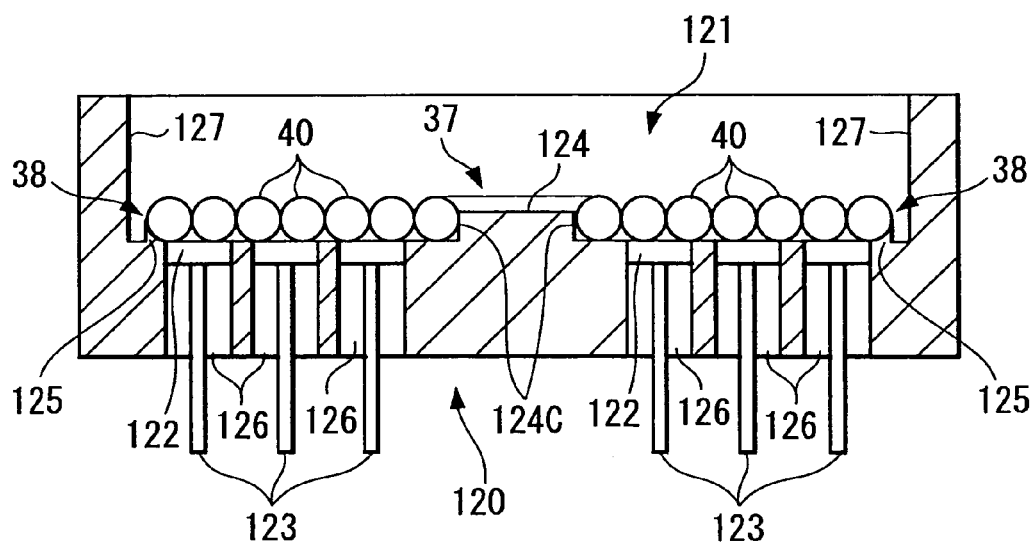
FIG. 29 is a diagram showing a state in which a planar coil is completely fitted into the planar coil-fitting portion of the magnetic layer formation device of an embodiment.

In the magnetic layer formation device 120 of this embodiment, configured as described above, when a magnetic solution is applied to a planar coil, formed by winding electric wire 40 in a spiral shape, to form a magnetic layer, the following process is carried out as a first process. The head plane positions of the respective ejection pin heads 122 are positioned so as to be substantially in the same plane as the bottom-face plane position of the planar coil-fitting portion 121, as shown in FIG. 28 and FIG. 29. In that state, the inner-periphery portion 37 of the planar coil is fitted in substantially close contact with the outer-periphery portion 124C of the cylindrical protruding portion 124 of the planar coil-fitting portion 121. Also, the outer-periphery portion 38 of the planar coil is fitted in substantially close contact with the curved shape of the cylindrical protruding portion 125 of the planar coil-fitting portion 121.

Figure 30:
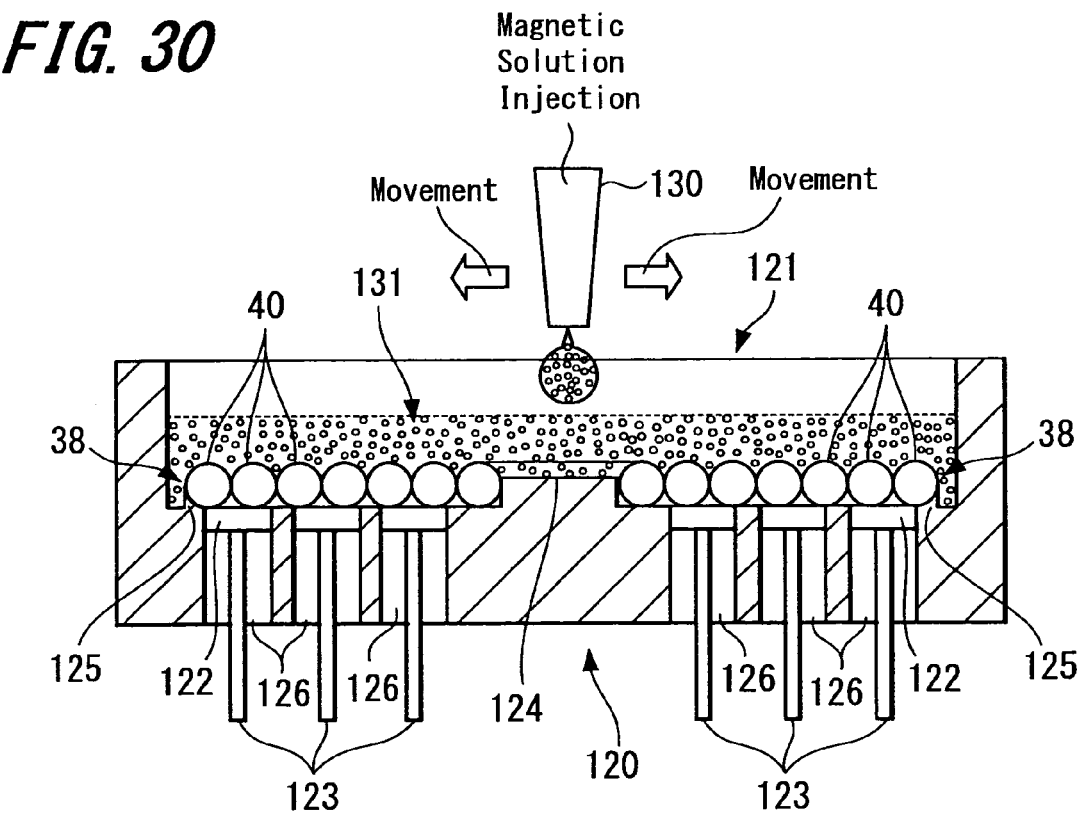
FIG. 30 is a diagram showing a state in which a magnetic solution is being injected into the planar coil-fitting portion of the magnetic layer formation device of an embodiment.
Figure 31:
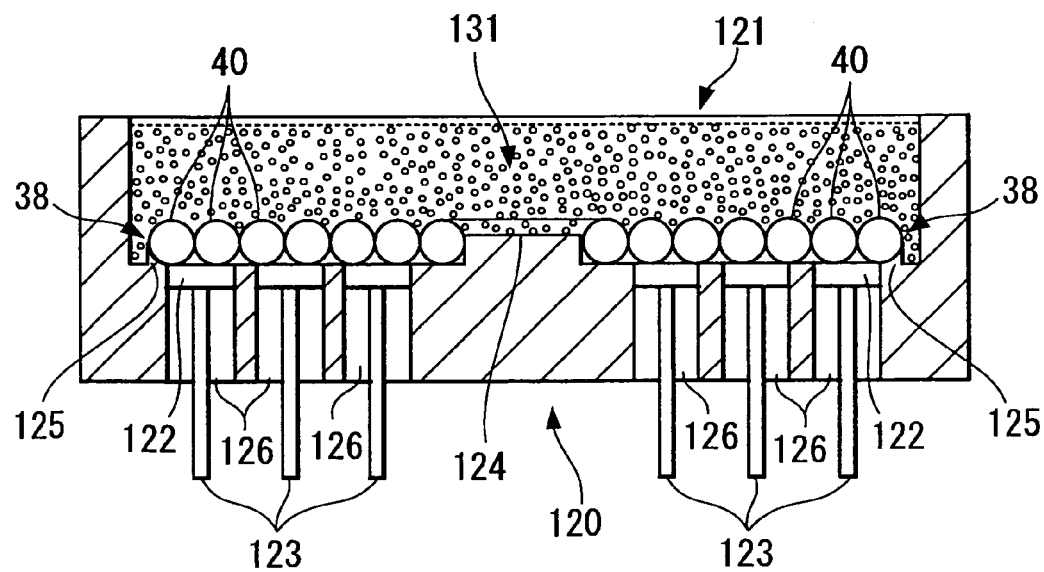
FIG. 31 is a diagram showing a state in which a magnetic solution is completely injected into the planar coil-fitting portion of the magnetic layer formation device of an embodiment.

Next, in a second process, as shown in FIG. 30 and FIG. 31, a magnetic solution injection mechanism is positioned above an aperture of the planar coil-fitting portion 121 in the state in which the planar coil is fitted. In this second process, while moving the magnetic solution injection mechanism 130 above the aperture of the planar coil-fitting portion 121, a predetermined amount of magnetic solution 131 is injected into the planar coil-fitting portion 121. In this second process, the predetermined amount of magnetic solution 131 injected by the magnetic solution injection mechanism 130 is an amount which determines the thickness of the magnetic layer on the planar coil after a compression-molding process and a drying process, which are subsequent processes.

Next, as a third process, as shown in FIG. 32 and FIG. 33, using a compression-molding mechanism 132, the magnetic solution 131 within the planar coil-fitting portion 121 is compression-molded until the magnetic solution 131 within the planar coil-fitting portion 121 reaches a predetermined height (thickness) from the bottom face of the planar coil-fitting portion 121. The compression-molding mechanism 132 is formed in, for example, a cylindrical shape and has an outer periphery of diameter slightly smaller than the diameter of the inner-wall portion 127 of the planar coil-fitting portion 121. The outer periphery slides along the wall face of the inner-wall portion 127 of the planar coil-fitting portion 121. In this third process, the predetermined height (thickness) of the magnetic solution 131 after compression-molding by the compression-molding mechanism 132 is an amount which determines the thickness of the magnetic layer on the planar coil after the drying process, which is a subsequent process. Then, when compression-molding to the predetermined height is completed, the compression-molding mechanism 132 is removed, and thereafter an ejection mechanism, not shown, is used to press the other ends of the ejection pin columns 123 toward the side of the planar coil-fitting portion 121. As a result, the planar coil, in a state in which the compression-molded magnetic solution 131 has been applied, is removed from the planar coil-fitting portion 121.

Next, the planar coil which has been removed is sent to a drying process, which is the fourth process. In this drying process, the magnetic solution 131 in the state of being applied onto the planar coil is dried by a drying mechanism 133. By means of drying, the volatile matter in the magnetic solution evaporates, so that the ferrite powder or other magnetic metal powder remains in a state of close adhesion to the planar coil, and the magnetic layer 100 is formed.

Figure 35:
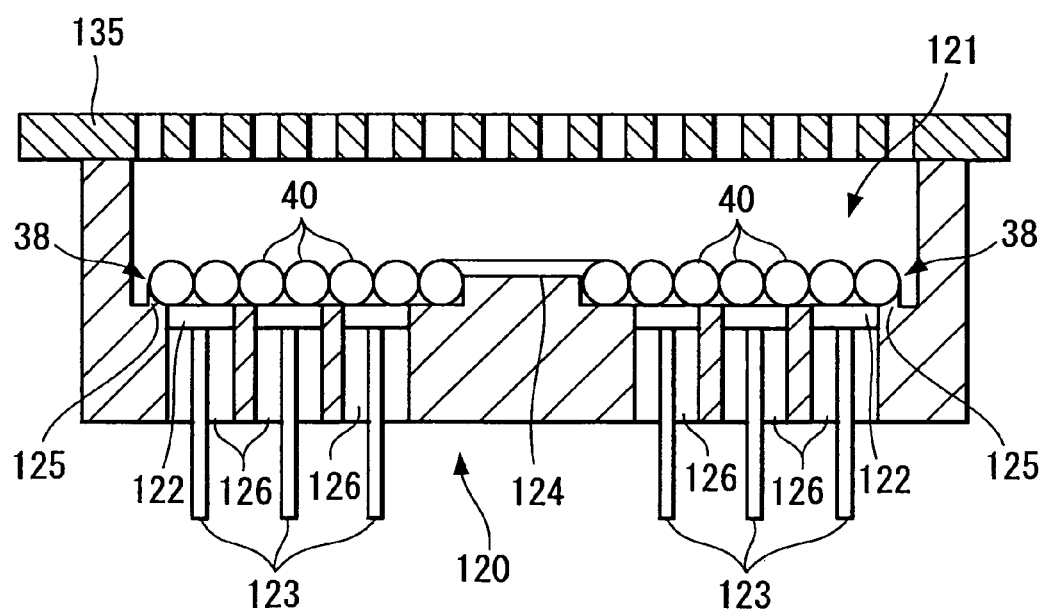
FIG. 35 is a diagram showing a state in which a porous screen is positioned at the planar coil-fitting portion of the magnetic layer formation device of an embodiment.
Figure 36:
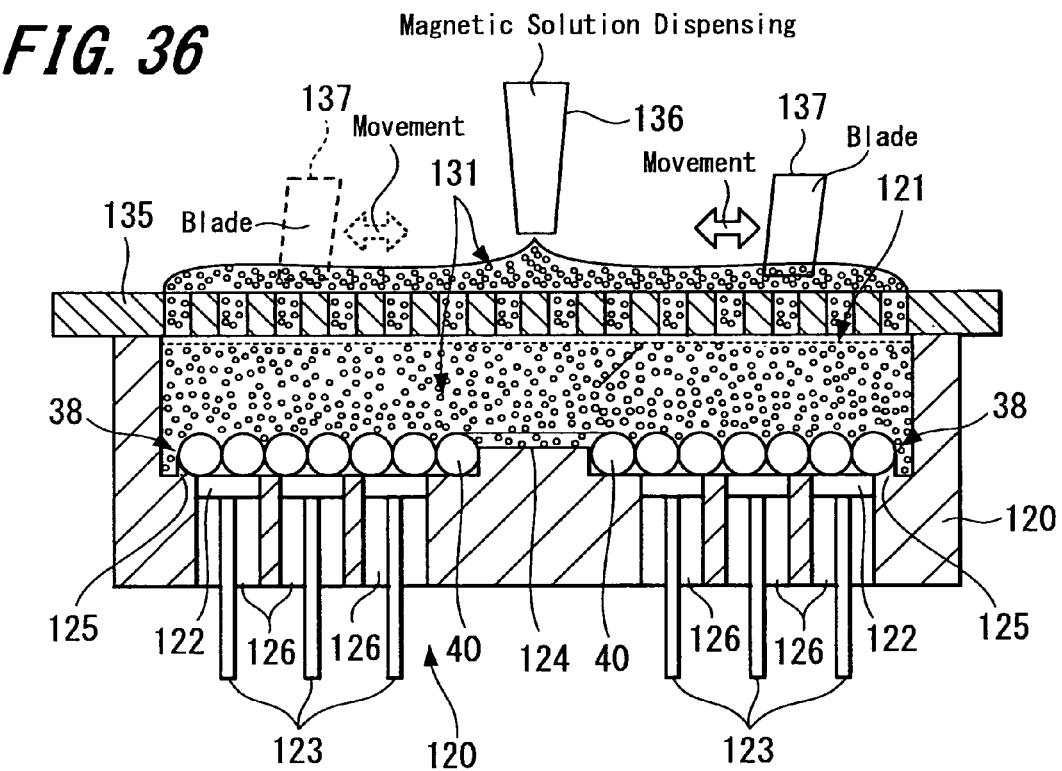
FIG. 36 is a diagram showing a state in which a magnetic solution is applied via a porous screen to the planar coil-fitting portion of the magnetic layer formation device of an embodiment.

The example shown in FIG. 26 through FIG. 34 explains a device and processes of using a magnetic solution injection mechanism 130 to inject a magnetic solution and form a magnetic layer. However, as shown in FIG. 35 and FIG. 36, a magnetic solution formation device according to an embodiment of this invention can use a screen application method to apply the magnetic solution and form a magnetic layer on a planar portion and side-face portion of a planar coil. FIG. 35 and FIG. 36 are schematic cross-sectional views, seen from a side, of a magnetic layer formation device 120.

In the case of forming a magnetic layer by such screen application method, the first process, the third process and the fourth process are similar to the processes described above, and so drawings and explanations of these processes are omitted. Specifically, fitting the planar coil into the planar coil-fitting portion 121, removing the coil after compression-molding of the magnetic solution in the planar coil-fitting portion 121 using a compression-molding mechanism 132, and drying the magnetic solution in the state of being applied onto the removed planar coil to form the magnetic layer in a state of deposition, are not described here.

When using a screen application method to form the magnetic layer, as the second process, a porous screen 135, magnetic solution dispenser 136, and blade mechanism 137 are positioned above the aperture of the planar coil-fitting portion 121 in the state in which the planar coil is fitted, as shown in FIG. 35 and FIG. 36. The porous screen 135 is a sheet-shaped utensil in which numerous minute holes are opened, and is positioned so as to cover the aperture of the planar coil-fitting portion 121. In this second process, the magnetic solution is dispensed from the magnetic solution dispenser 136 onto the porous screen 135 covering the planar coil-fitting portion 121. Also, in this second process, the blade mechanism 137 is moved over the porous screen 135, to cause the magnetic solution which has been dispensed from the magnetic solution dispenser 136 onto the porous screen 135 to be pressed into the minute holes of the porous screen 135 and to drip down from the minute holes into the planar coil-fitting portion 121. Accordingly, the magnetic solution which has passed through the minute holes of the porous screen 135 is injected evenly into the planar coil-fitting portion 121. After this second process, the third process described above is performed.

[Relation Between Magnetic Solution and Relative Permeability]

In the case of the above-described method of magnetic solution injection, magnetic solution is injected by a magnetic solution injection mechanism 130, so that concentration irregularities occur within the magnetic layer formed on the planar coil. However, the device configuration and processes can be made extremely simple, and as the magnetic powder in the magnetic solution, magnetic powder having large particle diameters, which is an extremely effective means of raising the relative permeability, can be used.

On the other hand, when adopting the above-described screen application method, there is some increase in the device complexity and in the processes required, and moreover there are limitations to an extent on the sizes of magnetic particles passing through the screen and on the viscosity at the time of magnetic solution application. However, concentration irregularities do not readily occur within the magnetic layer formed on the planar coil, and a uniform magnetic layer can be formed, so that such a method is extremely useful when a somewhat lower relative permeability is acceptable.

Figure 37:
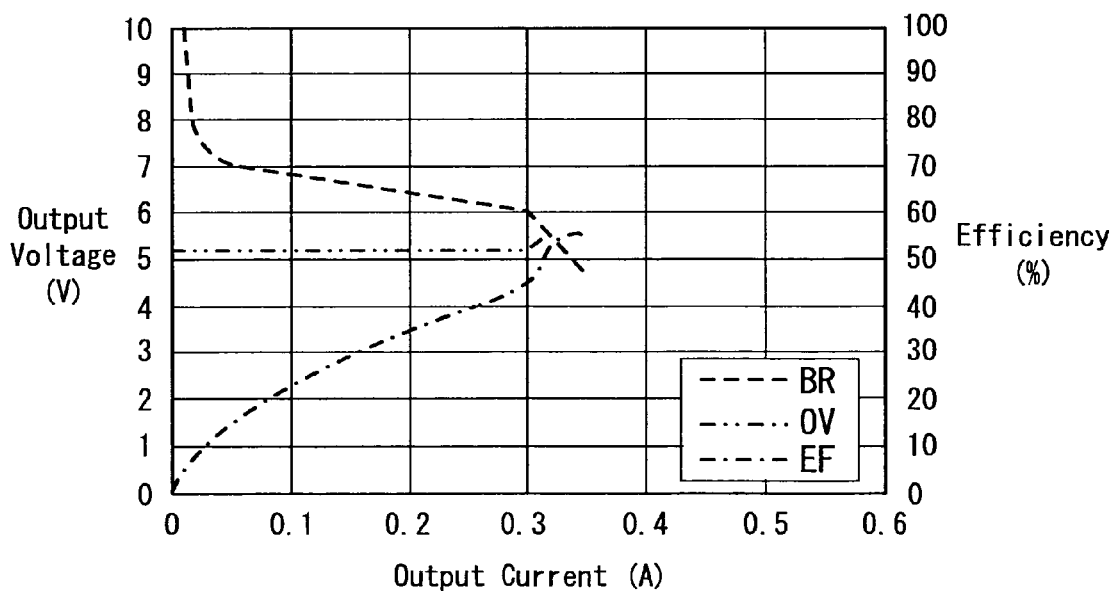
FIG. 37 is a characteristic diagram showing the relation between a bridge-connected magnetic path between planar coils and the output voltage and transmission efficiency, for a case in which a magnetic layer having a permeability of 30 is formed.
Figure 38:
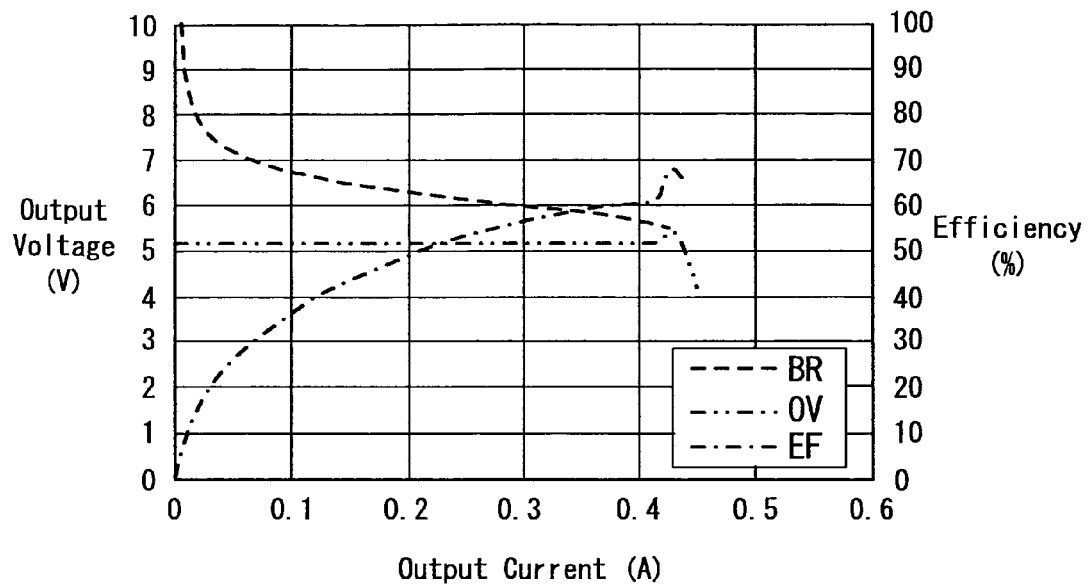
FIG. 38 is a characteristic diagram showing the relation between the bridge-connected magnetic path between planar coils and the output voltage and transmission efficiency, for a case in which a magnetic layer having a permeability of 50 is formed.
Figure 39:
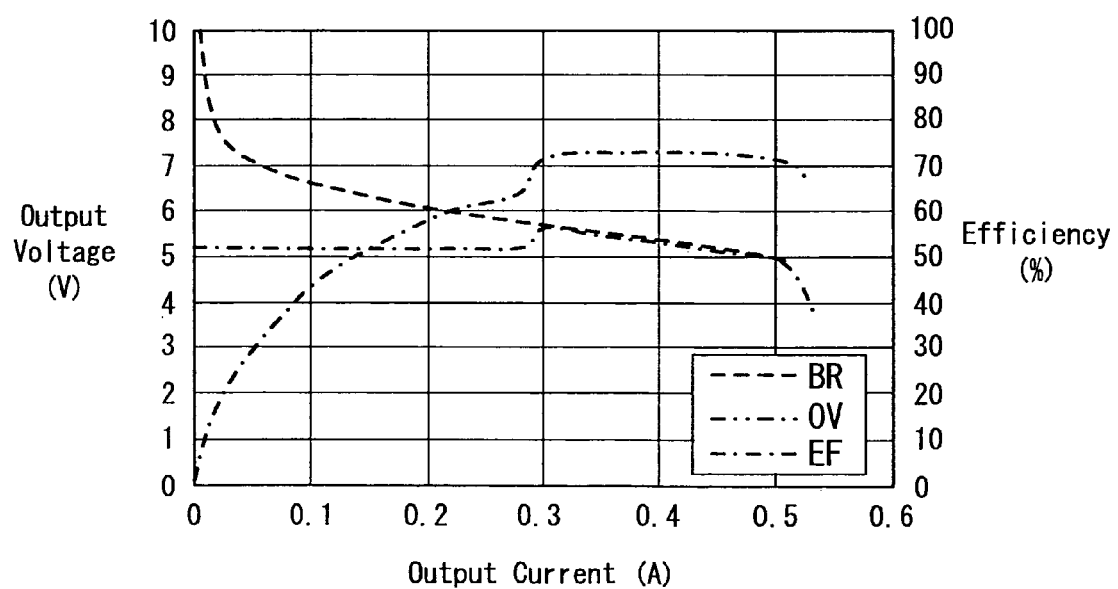
FIG. 39 is a characteristic diagram showing the relation between the bridge-connected magnetic path between planar coils and the output voltage and transmission efficiency, for a case in which a magnetic layer having a permeability of 70 is formed.

FIG. 37 to FIG. 39 show the relationship between a bridge-connected magnetic path between planar coils and the output voltage and transmission efficiency, measured when determining the value of the relative permeability of the magnetic layer in this embodiment. The dashed lines BR in FIG. 37 through FIG. 39 describe the output voltage versus output current characteristic for the bridge-connected magnetic path; the dot-dot-dash lines OV describe the changes in output voltage; and the dot-dash lines EF in the figures describe the transmission efficiency characteristics. FIG. 37 shows an example in which the permeability of the magnetic layer is 30; FIG. 38 shows an example in which the permeability of the magnetic layer is 50; and FIG. 39 shows an example in which the permeability of the magnetic layer is 70.

In the case of an application in which rapid charging of a mobile phone unit is performed, for example, an output voltage of approximately 4.5 V to 5.5 V and an output current of approximately 0.4 A to 0.6 A may be necessary, and so a magnetic layer with a high permeability may be used. Hence, in this embodiment, based on the characteristic curves of FIG. 37 through FIG. 39 and on the output voltage and output current values necessary for noncontact power transmission between a mobile phone unit and a cradle, the concentration of the magnetic material relative to the binder solvent is adjusted. Specifically, as the magnetic solution used with the above-described magnetic layer formation device and magnetic layer formation processes, there is used such magnetic solution that the relative permeability of the magnetic layer after formation on the planar coil is 50 or higher.

The explanations of the above embodiments are examples of the invention. Hence, the invention is not limited to the above-described embodiments, and of course various modifications are possible according to design and other requirements, as long as there is no deviation from the technical gist of the invention.

In the above-described embodiments, an example of a mobile phone unit 2 is explained with respect to reducing the thickness of the noncontact power-transmission coil; but the invention can also be applied to a cradle 1. In addition, in those embodiments, the noncontact power-transmission coil has functions of only transmitting power or receiving the power; but this invention can be applied to a noncontact power-transmission coil which is provided with functions for both power transmission and for power reception.

Further, in these embodiments, examples are explained in which a mobile phone unit 2 and cradle 1 are combined. However, the invention is not limited to such a combination and, for example, application to planar coils used in combinations of a PDA (Personal Digital Assistant) or various other portable terminals with cradles, as well as to noncontact IC cards and reader/writers therefore, and similar are also possible.

It should be understood by those skilled in the art that various modifications, combinations, sub-combinations, and alterations may occur, depending on design requirements and other factors, insofar as they are within the scope of the appended claims or the equivalents thereof.

What is claimed is:

1. A noncontact power-transmission coil, comprising:
a planar coil, formed by winding a linear conductor in a spiral shape substantially in a single plane, the planar coil defining a series of coil turns with sequential ones of the coil turns being in contact with one another to form alternating ones of exterior protrusions and exterior depressions on an exterior side planar portion of the planar coil and alternating ones of interior protrusions and interior depressions on an interior side planar portion of the planar coil; and, a cured magnetic layer mixture of magnetic particles and a binder solvent, so as to completely cover exterior protrusions and occupy the exterior depressions on the exterior side planar portion of the planar coil while the interior depressions define empty space between sequential ones of the interior protrusions the cured magnetic layer mixture also covering a side face portion of the planar coil.

2. A noncontact power-transmission coil according to claim 1, wherein
the planar coil is formed by winding the linear conductor, including either single wire or twisted wire, in a spiral shape substantially in the same plane.

3. A noncontact power-transmission coil according to claim 2, further comprising
a flexible printed-circuit board on which are formed first and second external connection terminal portions, a first contact portion connected to an inner periphery-side end portion of the linear conductor wound into a spiral shape, a second contact portion connected to an outer periphery-side end portion of the linear conductor wound into a spiral shape, a first conductor pattern connecting the first contact portion and the first external connection terminal portion, and a second conductor pattern connecting the second contact portion and the second external connection terminal portion, wherein
the interior protrusions on the interior side planar portion of the planar coil are affixed to the surface of the flexible printed-circuit board.

4. A noncontact power-transmission coil according to claim 1,
wherein the planar coil has a plurality of laminated flexible printed-circuit boards, on each of which is formed a spiral-shape conductor pattern, and which are formed into a shape which substantially matches the outer-perimeter shape of the spiral-shape conductor pattern, a first through-hole which electrically connects inner-periphery pattern end portions of the conductor patterns of each layer of the laminated flexible printed-circuit boards, and a second through-hole which electrically connects outer-periphery pattern end portions of the conductor patterns of each layer of the laminated flexible printed-circuit boards, and
wherein one flexible printed-circuit board layer among the layers of the flexible printed-circuit board has first and second external connection terminal portions, a first conductor pattern which electrically connects the first through-hole with the first external connection terminal portion, and a second conductor pattern which electrically connects the second through-hole with the second external connection terminal portion.

5. A noncontact power-transmission coil according to claim 1, wherein
the planar coil has a central hole in an inner-periphery portion of the linear conductor wound into a spiral shape and has the magnetic layer formed by applying the magnetic solution so as to fill the central hole of the planar coil.

6. A portable terminal, comprising:
a noncontact power-transmission coil, having a rechargeable battery, a planar coil formed by winding a linear conductor in a spiral shape in substantially the same plane, the planar coil defining a series of coil turns with sequential ones of the coil turns being in contact with one another to form alternating ones of exterior protrusions and exterior depressions on an exterior side planar portion of the planar coil and alternating ones of interior protrusions and interior depressions on an interior side planar portion of the planar coil, and a cured magnetic layer mixture of magnetic particles and a binder solvent, so as to completely cover exterior protrusions and occupy the exterior depressions on the exterior side planar portion of the planar coil while the interior depressions define empty space between sequential ones of the interior protrusions the cured magnetic layer mixture also covering a side face portion of the planar coil; and,
a charging control circuit, which executes control to charge the rechargeable battery with power received via the noncontact power-transmission coil.

7. A portable terminal according to claim 6, wherein
the planar coil of the noncontact power-transmission coil is formed by winding the linear conductor, including a single wire or twisted wire, in a spiral shape in substantially the same plane.

8. A portable terminal according to claim 7,
wherein the noncontact power-transmission coil has a flexible printed-circuit board, on which are formed first and second external connection terminal portions, a first contact portion connected to an inner periphery-side end portion of the linear conductor wound into a spiral shape, a second contact portion connected to an outer periphery-side end portion of the linear conductor wound into a spiral shape, a first conductor pattern connecting the first contact portion and the first external connection terminal portion, and a second conductor pattern connecting the second contact portion and the second external connection terminal portion, and
wherein the interior protrusions on the interior side planar portion of the planar coil are affixed to the surface of the flexible printed-circuit board.

9. A portable terminal according to claim 6,
wherein the planar coil of the noncontact power-transmission coil has a plurality of laminated flexible printed-circuit boards, on each of which is formed a spiral-shape conductor pattern, and which are formed into a shape which substantially matches the outer-perimeter shape of the spiral-shape conductor pattern, a first through-hole which electrically connects inner-periphery pattern end portions of the conductor patterns of each layer of the laminated flexible printed-circuit boards, and a second through-hole which electrically connects outer-periphery pattern end portions of the conductor patterns of each layer of the laminated flexible printed-circuit boards, and
wherein one flexible printed-circuit board layer among the layers of the flexible printed-circuit board has first and second external connection terminal portions, a first conductor pattern which electrically connects the first through-hole with the first external connection terminal portion, and a second conductor pattern which connects the second through-hole with the second external connection terminal portion.

10. A portable terminal according to claim 6, wherein
the planar coil of the noncontact power-transmission coil has a central hole in an inner-periphery portion of the linear conductor wound into a spiral shape, and having the magnetic layer formed by applying the magnetic solution so as to fill the central hole of the planar coil.

11. A terminal charging device, comprising:
a terminal mounting base, on which a predetermined portable terminal including a rechargeable battery is mounted;
a noncontact power-transmission coil, having a planar coil, formed by winding a linear conductor in a spiral shape substantially in the same plane, the planar coil defining a series of coil turns with sequential ones of the coil turns being in contact with one another to form alternating ones of exterior protrusions and exterior depressions on an exterior side planar portion of the planar coil and alternating ones of interior protrusions and interior depressions on an interior side planar portion of the planar coil, and a cured magnetic layer mixture of magnetic particles and a binder solvent, so as to completely cover exterior protrusions and occupy the exterior depressions on the exterior side planar portion of the planar coil while the interior depressions define empty space between sequential ones of the interior protrusions with the cured magnetic layer mixture also covering a side face portion of the planar coil, and using electromagnetic induction with a coil installed in the predetermined portable terminal to charge the rechargeable battery of the portable terminal in a noncontact manner; and a power supply control unit which controls power supply to the noncontact power-transmission coil.

12. A terminal charging device according to claim 11, wherein the planar coil of the noncontact power-transmission coil is formed by winding a linear conductor, comprising a single wire or twisted wire, in a spiral shape in substantially the same plane.

13. A terminal charging device according to claim 12, wherein the noncontact power-transmission coil has a flexible printed-circuit board, on which are formed first and second external connection terminal portions, a first contact portion connected to an inner periphery-side end portion of the linear conductor wound into a spiral shape, a second contact portion connected to an outer periphery-side end portion of the linear conductor wound into a spiral shape, a first conductor pattern connecting the first contact portion and the first external connection terminal portion, and a second conductor pattern connecting the second contact portion and the second external connection terminal portion, and wherein the interior protrusions on the interior side planar portion of the planar coil are affixed to the surface of the flexible printed-circuit board.

14. A terminal charging device according to claim 11, wherein the planar coil of the noncontact power-transmission coil has a plurality of laminated flexible printed-circuit boards, on each of which is formed a spiral-shape conductor pattern, and which are formed into a shape which substantially matches the outer-perimeter shape of the spiral-shape conductor pattern, a first through-hole which electrically connects inner-periphery pattern end portions of the conductor patterns of each layer of the laminated flexible printed-circuit boards, and a second through-hole which electrically connects outer-periphery pattern end portions of the conductor patterns of each layer of the laminated flexible printed-circuit boards, and wherein one flexible printed-circuit board layer among the layers of the flexible printed-circuit board has first and second external connection terminal portions, a first conductor pattern which electrically connects the first through-hole with the first external connection terminal portion, and a second conductor pattern which connects the second through-hole with the second external connection terminal portion.

15. A terminal charging device according to claim 11, wherein the planar coil of the noncontact power-transmission coil has a central hole in an inner-periphery portion of the linear conductor wound into a spiral shape, and having the magnetic layer formed by applying the magnetic solution so as to fill the central hole of the planar coil.

* * * * *